US006870154B1

(12) United States Patent
Konermann et al.

(10) Patent No.: US 6,870,154 B1
(45) Date of Patent: Mar. 22, 2005

(54) CAPILLARY MIXER WITH ADJUSTABLE REACTION CHAMBER VOLUME FOR MASS SPECTROMETRY

(75) Inventors: Lars Konermann, London (CA); Derek J. Wilson, London (CA)

(73) Assignee: The University of Western Ontario, London (CA)

( * ) Notice: Subject to any disclaimer, the term of this patent is extended or adjusted under 35 U.S.C. 154(b) by 0 days.

(21) Appl. No.: 10/788,843

(22) Filed: Feb. 27, 2004

(51) Int. Cl.[7] .......................... B01D 59/44; H01J 49/04
(52) U.S. Cl. ........................ 250/281; 250/282; 250/288
(58) Field of Search ................................ 250/288, 282; 259/281

(56) References Cited

U.S. PATENT DOCUMENTS

| | | | | |
|---|---|---|---|---|
| 5,115,131 | A | 5/1992 | Jorgenson et al. | 250/288 |
| 5,170,053 | A | 12/1992 | Hail et al. | 250/288 |
| 6,054,709 | A | 4/2000 | Douglas et al. | 250/288 |
| 6,166,379 | A * | 12/2000 | Montaser et al. | 250/288 |
| 6,274,867 | B1 * | 8/2001 | Wells et al. | 250/288 |
| 6,350,987 | B1 | 2/2002 | Northrup et al. | 250/282 |
| 6,458,597 | B1 | 10/2002 | Andrien, Jr. et al. | 436/173 |
| 2003/0164449 | A1 | 9/2003 | Heinzle et al. | 250/281 |

OTHER PUBLICATIONS

Li, Z. et al. "A Snapshot of Enzyme Catalysis Using Electrospray Ionization Mass Spectrometry"; *Journal of American Chemical Society Communications*; 2003; vol. 125; No. 33; pp. 9938–9939.

Wilson, D.J. et al. "A Capillary Mixer with Adjustable Reaction Chamber Volume for Millisecond Time–Resolved Studies by Electrospray Mass Spectrometry"; *Analytical Chemistry*; Dec. 1, 2003; vol. 75; No. 23; pp. 6408–6414.

Wilson, D.J. et al. "Mechanistic Studies on Enzymatic Reactions by Electrospray Ionization MS Using a Capillary Mixer with Adjustable Reaction Chamber Volume for Time–Resolved Measurements"; *Analytical Chemistry*; May 1, 2004; vol. 76; No. 9; pp. 2537–2543.

Wilson, D.J. et al "Using Mass Spectromety to Measure Biological Reaction Kinetics"; *Biological Journal Supplement*; 2003; vol. 48; No. 2; Part 2; p. 492a.

* cited by examiner

*Primary Examiner*—Nikita Wells
*Assistant Examiner*—James J. Leybourne
(74) *Attorney, Agent, or Firm*—Baker & Daniels

(57) ABSTRACT

Disclosed is a capillary mixer for mixing first and second reactant solutions to form a mixed solution prior to delivering the mixed solution to an ion source of a mass spectrometer. The mixer comprises: a pair of concentric capillaries consisting of: an outer capillary connected at a distal end to an inlet of the ion source and being connected at a proximal end to a source of the second reactant solution; and an inner capillary within the outer capillary, thereby forming an annular intercapillary space between the outer and inner capillaries, wherein: the inner capillary is connected at a proximal end to a source of the first reactant solution and has an opening at or near a distal end, is slidably sealed to the outer capillary at or near the proximal end of the outer capillary and is movable back and forth within the outer capillary, whereby the first reactant solution is delivered through the inner capillary and the second solution is delivered through the intercapillary space; and the first and second reactant solutions get mixed to form the mixed solution in a mixing region within the intercapillary space into which the first reactant solution is expelled through the opening. Because the inner capillary is movable, the reaction chamber volume is adjustable. As a result, both spectral and kinetic modes of operation can be conducted by using the same mixer.

21 Claims, 14 Drawing Sheets

CAPILLARY MIXER WITH ADJUSTABLE REACTION CHAMBER VOLUME FOR MASS SPECTROMETRY

FIELD OF INVENTION

The present invention relates to (1) a capillary mixer for mass spectrometry, (2) a mass spectrometer connected to the capillary mixer, and (3) a method of analyzing a solution phase reaction using the mass spectrometer.

BACKGROUND ART

Soon after the advent of electrospray ionization mass spectrometry (ESI-MS) in the late 1980s, it became clear that this technique has an enormous potential for kinetic studies on solution-phase reactions.[3, 4] Following the initiation of a (bio)-chemical process by mixing of two or more reactants, the kinetics can be monitored on-line, i.e., by direct injection of the reaction mixture into the ion source. The relative concentrations of multiple reactive species can be recorded as a function of time with extremely high sensitivity and selectivity. Transient intermediates may be identified based on their mass-to-charge ratio or their MS/MS characteristics. On-line ESI-MS kinetic studies have been carried out in a wide range of areas, including bioorganic chemistry,[5, 6] enzymology,[7-11] protein folding and assembly,[12, 13] and isotope exchange experiments in the context of protein conformational dynamics.[14-19]

The use of ionization techniques other than ESI for on-line kinetic MS studies has been explored by a number of groups.[20-22] Due to its versatility, however, ESI-MS remains by far the most popular technique for studies of this kind. An alternative approach for kinetic measurements involves the use of quench-flow techniques in conjunction with off-line MS analysis.[23, 24] In quench-flow experiments, the reaction is initiated by rapid mixing of the reactants, followed by mixing with a quenching agent, such as acid, base, or organic solvent, that abruptly stops the reaction after a specified period of time. An advantage of that technique is the possible incorporation of purification steps in situations where components of the reaction mixture would interfere with the MS analysis. Quench-flow methods undoubtedly represent a powerful tool for kinetic studies, but they can be problematic in cases where reactive species are not stable under the conditions of the quenched reaction mixture. Also, quench-flow studies are laborious because individual time points have to be measured in separate experiments.

Of particular importance for studies on a wide range of chemical and biochemical systems are techniques capable of providing kinetic data on rapid time scales, i.e., seconds to milliseconds or even microseconds.[25] On-line ESI-MS methods have been used for characterizing processes with half-lives down to roughly 30 ms.[16] This temporal resolution is orders of magnitude lower than that obtainable in rapid-mixing experiments with optical detection.[26, 27] It therefore appears that there might still be considerable room for extending the time range that is accessible to MS-based kinetic techniques.

On-line kinetic studies can be carried out in two different modes of operation: (i) In "kinetic mode", the abundance of one or more species is monitored as a function of time, e.g., by monitoring the intensity at selected m/z values on a quadrupole mass analyzer. This type of experiment provides detailed intensity-time profiles for individual reactive species, which allows the accurate determination of rate constants. Stopped-flow ESI-MS is a method capable of providing highly accurate data in kinetic mode.[28, 29] Unfortunately, this approach requires prior knowledge of the m/z value(s) of interest, thus posing a serious limitation for studies on processes that involve unknown intermediates. Also the stopped-flow ESI-MS has inherent time resolution limitations and hence so far it has not been possible to extend this technique below the range of ~O./S. (ii) For experiments carried out in "spectral mode", entire mass spectra are recorded for selected reaction times, which allows the detection and identification of transient intermediates. The use of stopped-flow ESI-MS for studies in spectral mode is difficult, because entire mass spectra would have to be recorded on a millisecond time scale, which poses a challenge even for time-of-flight instruments or quadrupole ion traps. Experiments in spectral mode are more easily carried out by using continuous-flow methods. In contrast to stopped-flow ESI-MS, this approach does not involve real-time data acquisition; spectral mode data can therefore be recorded even with slow-scanning mass analyzers.[5, 12, 15, 30, 31] Usually, the reaction chamber in continuous-flow studies is a capillary that is mounted between a mixer and the ESI source. The reaction time is determined by the capillary dimensions and by the solution flow rate. Controlling the reaction time by changing the solution flow rate is not advisable because this may result in artifactual changes of analyte ion abundances. Reaction capillaries of different; length are therefore most commonly used for recording spectra at different times points. A drawback of existing continuous-flow methods is the difficulty of obtaining intensity-time profiles of selected ions. These kinetic mode data have to be "pieced together" from multiple measurements carried out with different capillary lengths, in a manner analogous to quench-flow studies.

Thus, it was desired to improve capillaries for mixing reactant solutions for ESI-MS based reaction analyses.

SUMMARY OF INVENTION

A first aspect of the present invention provides a capillary mixer for mixing a first reactant solution and a second reactant solution to form a mixed solution prior to delivering the mixed solution to an ion source of an ionization mass spectrometer, which mixer comprises:

a pair of concentric capillaries consisting of:

an outer capillary which is connected at a distal end thereof directly or indirectly to an inlet of the ion source and is to be connected at or near a proximal end thereof to a source of the second reactant solution; and an inner capillary within the outer capillary, thereby forming an annular intercapillary space between the outer and inner capillaries, wherein:

the inner capillary is to be connected at a proximal end thereof to a source of the first reactant solution and has an opening at or near a distal end thereof, is slidably sealed to the outer capillary at or near the proximal end of the outer capillary and is movable back and forth within the outer capillary, whereby in use, the first reactant solution is delivered from the source thereof through the inner capillary in a direction from the proximal end toward the distal end and the second solution is delivered from the source thereof through the intercapillary space in a direction from the proximal end to the distal end; and the first and second reactant solutions so delivered get mixed to form the mixed solution in a mixing region within the intercapillary space into which the first reactant solution is expelled through the opening.

Preferably, the inner capillary is plugged at the distal end thereof and one or more of the openings are formed in a wall of the inner capillary so that the first reactant solution is expelled laterally with respect to the axis of the capillaries into the mixing region.

In certain embodiments, the distal end of the inner capillary has the opening so that the first reactant straightly exits from the open end. Still alternatively, the distal end of the inner capillary may have a more complex mixer (for example, a shower head geometry) to facilitate a diffusive mixing of the reactant solutions.

In certain embodiments, the outer capillary is integrally formed with the inlet of the ion source, and so it is preferably of an electrically conductive heat-resistant material. In such a case, a preferred material of the outer capillary is stainless steel or a similar metallic material inert to the reaction mixture.

The inner capillary is preferably made of silica, glass or a similar material.

In certain embodiments, the capillary mixer may further comprise at least one mixing section (such as a mixing tee or an on line dialysis device) downstream of the mixing region (namely between the inlet of the ion source and the distal end of the outer capillary). In this case, the outer capillary is attached to the inlet of the ion source indirectly (via the mixing section). This mixing section may be used for adding a further liquid, e.g., an ESI-friendly makeup solvent, immediately prior to ionization. However, often, such a mixing tee is unnecessary and the mixer lacks the mixing tee.

A second aspect of the present invention provides an ionization mass spectrometer, such as an electrospray ionization mass spectrometer (ESI-MS) or an atmospheric pressure chemical ionization mass spectrometer (APCI-MS), employing the above-mentioned capillary mixer. The ionization mass spectrometer comprises:

an ion source, a mass spectrometer downstream of the ion source, and the above-described capillary mixer.

The ion source may be an electrospray ion source or an atmospheric pressure chemical ionization source.

A third aspect of the present invention provides a method of analyzing a solution phase reaction using the ionization mass spectrometer.

Broadly, the method comprises the steps of:

delivering the first reaction solution from the source thereof through the inner capillary in a direction from the proximal end toward the distal end and delivering the second reactant solution from the source thereof through the intercapillary space in a direction from the proximal end toward the distal end, expelling the first reactant solution through the opening into a mixing region of the intercapillary space to mix the first and second reactant solutions, thereby forming a mixed reactant solution and initiating the solution phase reaction, and delivering the mixed reaction solution from the mixing region to the ion source, to form ions of at least one product or intermediate product or both of the reaction the ions being detected by the mass spectrometer.

Up until now, different experimental methods had to be used for obtaining millisecond time-resolved MS data in kinetic and in spectral mode. The present invention provides a continuous-flow mixer with adjustable reaction chamber volume that is capable of both modes of operation. Data can be recorded in kinetic mode by continually increasing the distance between the mixer and the ion source, while monitoring the abundance of selected ions. Alternatively, spectral mode experiments can be performed by choosing certain (fixed) reaction chamber volumes, such that entire mass spectra can be generated for selected time points. The temporal resolution of this system exceeds that of previous ESI-MS-based kinetic methods.

The method of the present invention allows the reaction time of the kinetic experiment to be adjusted without having to install different capillaries and without changing the solution flow rate in the capillary. This adjustment can be made continuously to allow experiments in kinetic mode.

BRIEF DESCRIPTION OF THE DRAWINGS

FIG. 3 is graphs showing age distribution functions P ($\tau$, a) plotted vs. solution age a for laminar flow obtained in Example 1.

FIG. 4 is graphs showing simulated kinetic profiles for continuous-flow ESI-MS experiments. The natural logarithm of the signal intensity $\langle C(\tau)\rangle$ is plotted as a function of average reaction time $\tau$ for a first-order reaction with C(t)=exp(−kt).

DESCRIPTION OF PREFERRED EMBODIMENTS

Figure 1:
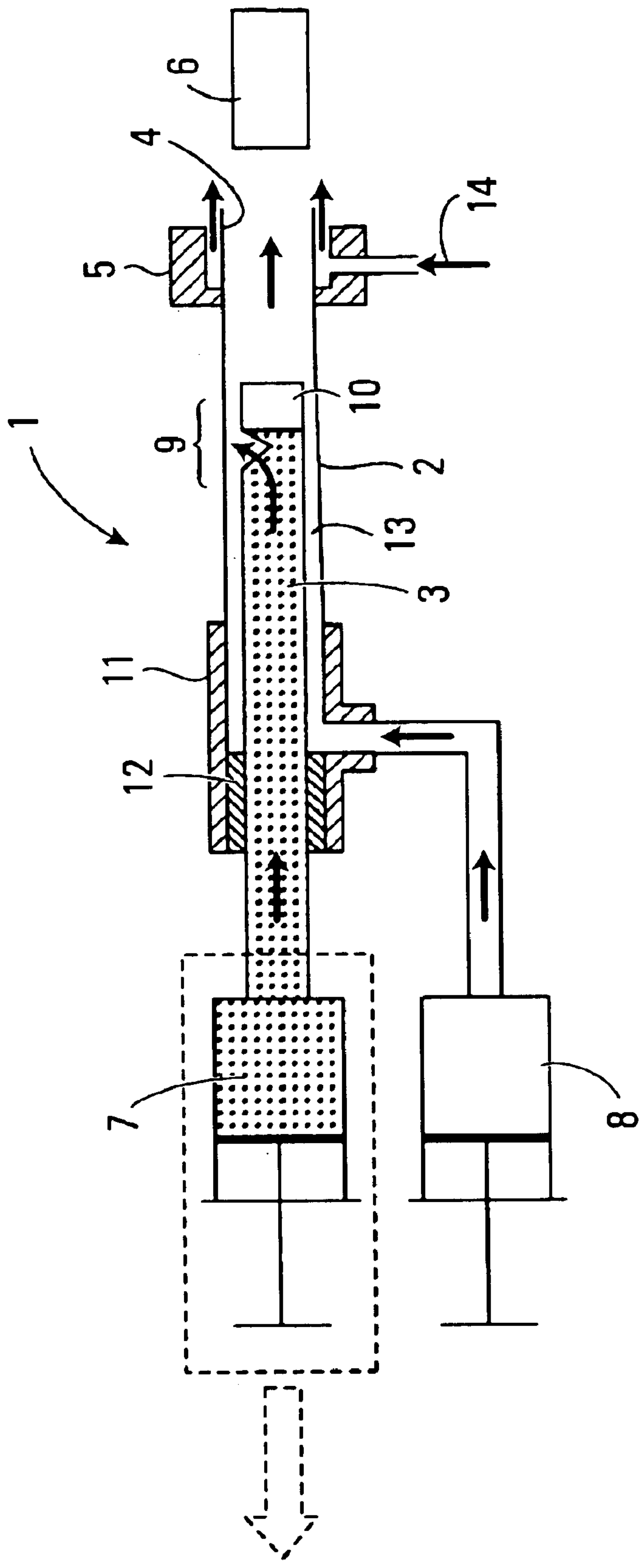
FIG. 1 is a schematic cross-sectional view of the capillary mixer according to a preferred embodiment of the present invention.

Referring to FIG. 1, a preferred embodiment of the capillary mixer of the present invention is described. The capillary mixer 1 comprises a pair of concentric capillaries consisting of an outer capillary 2 and an inner capillary 3. The outer capillary 2 is formed at its distal end integrally with an inlet 4 of an ion source 5, e.g., electrospray ion (ESI) source, upstream of a mass spectrometer 6.

The capillary mixer of this embodiment is a continuous-flow mixing apparatus. The reaction of interest is initiated by mixing solutions from syringes 7 and 8 in a mixing region 9 near the distal end of the inner capillary. The plungers of both syringes are advanced simultaneously and continuously by syringe pumps (Harvard Apparatus, model 22, Saint Laurent, PQ, Canada). The inner capillary is made of fused silica (100±1.5 μm i.d., 167±3 μm o.d. Polymicro Technologies, Phoenix, Ariz.). Its distal end is plugged by a plug 10 made of rapid curing, self-priming polyimide (HD Microsystems, Parlin, N.J.). About 2 mm upstream from this plug, a ~80 μm deep notch is cut into the side of the inner capillary, which allows solution from syringe 7 to be expelled into the –8-μm-wide intercapillary space 9. The outer capillary 2 is made of stainless steel (182±2 μm i.d., 356±6 μm o.d., Small Parts, Miami Lakes, Fla.) and has a length of 13 cm. The inner capillary passes through a three-way polyetherether ketone (PEEK) union 11 (Upchurch Scientific, Oak Harbor, Wash.) and is directly connected to syringe 7. Within the PEEK union, a Flexon™ sleeve 12 (Alltech, Deerfield, Ill.) around the inner capillary prevents leaking of the solution at the proximal end of the outer capillary. The opposite end of the PEEK union is connected to the outer capillary, while its third port is connected to an inlet tube that delivers solution from syringe 8. This solution flows through the intercapillary space 13 until it passes the mixer. The volume of the mixing region can be approximated as the ~8-μm-wide and roughly 2-mm-long intercapillary space downstream of the notch, which corresponds to ~8 nL. For a total liquid flow rate of 60 μL/min, this results in a theoretical dead time (mixing time) of ~8 ms.

A 3-mm-long Delron™ block accommodates the distal end of the outer capillary. It has an inlet 14 for compressed air and is designed to provide a collateral gas flow around the reaction mixture that exits from the capillary outlet. The high-voltage power supply of a triple quadrupole mass spectrometer (PE Sciex, API 365, Concord, ON, Canada) is connected directly to the outer capillary. This allows the production of gas-phase ions at the capillary outlet by pneumatically assisted ESI. Subsequently, these ions pass through the differentially pumped interface into the vacuum chamber of the mass spectrometer. The sprayer voltage was held at 6 kV.

The inner capillary can be automatically pulled back together with syringe 7 (as indicated by the dashed arrows), thus providing a means for controlling the average; reaction time τ. Solid arrows indicate the directions of liquid flow. Small arrows in the ESI source region represent the directions of air flow.

Figure 2:
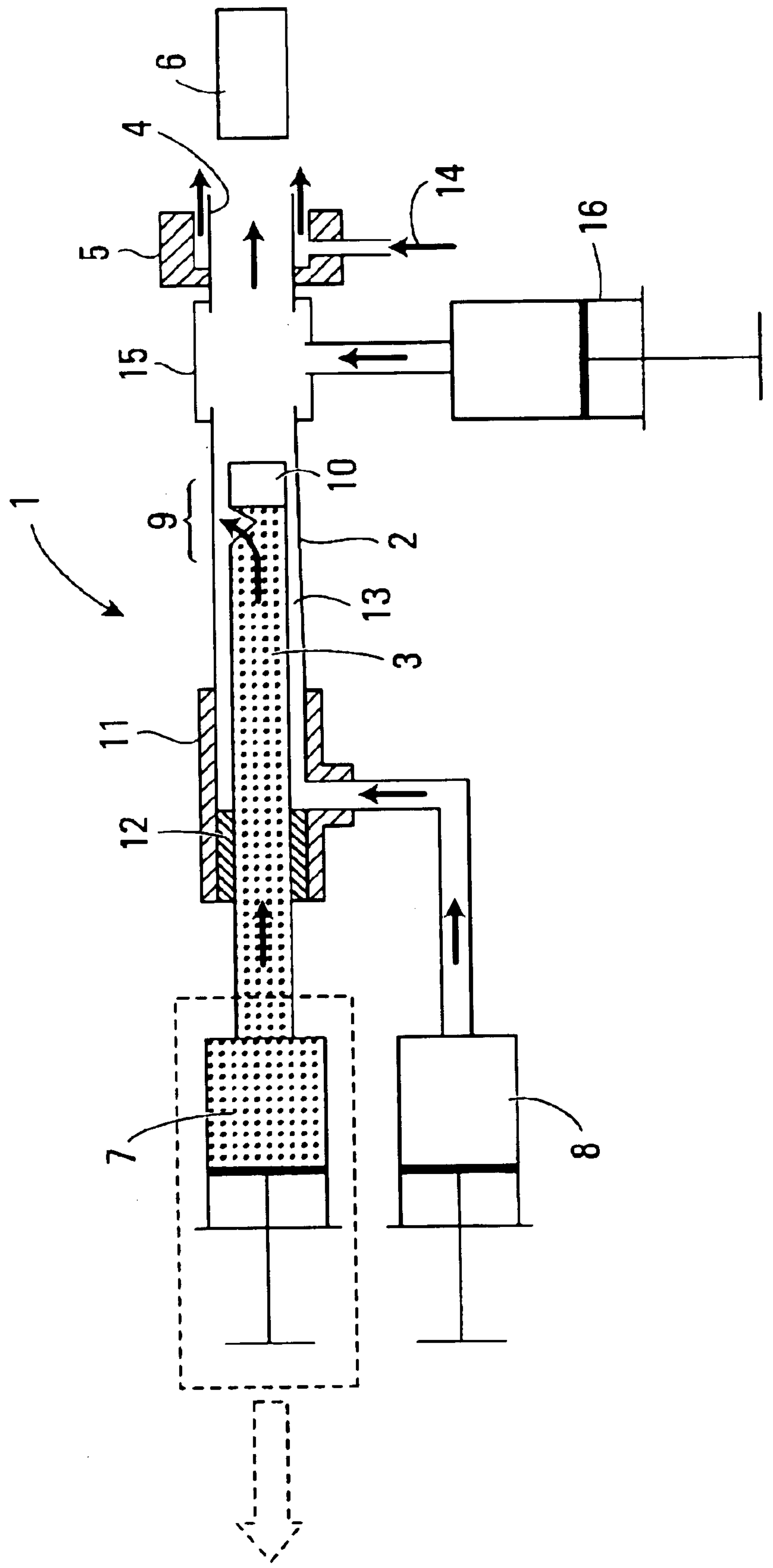
FIG. 2 is a schematic view of the capillary mixer according to another preferred embodiment of the present invention.

Referring to FIG. 2, another preferred embodiment of the capillary mixer according to the present invention is described. This capillary mixer is essentially the same as that depicted in FIG. 1, hence the same elements of the mixer of FIG. 2 are given the same reference numbers as FIG. 1. The capillary mixer of FIG. 2 additionally has a mixing tee 15 between the distal end of the outer capillary 2 and the mixing region 9. The mixing tee 15 allows the addition of an ESI-friendly make-up solvent to the reaction mixture, when the ESI-friendly make-up solvent is required or desired, immediately prior to ionization. In this particular embodiment depicted in FIG. 2, the mixing tee 15 is made of Flexon™ HP tubing (Alltech, Deerfield, Ill.). Its two inlets accommodate the distal end of the outer capillary and its third inlet is made of a fused silica capillary (100±1.5 μm i.d., 163±3 μm o.d., Polymicro Technologies, Phoenix, Ariz.) for addition of the make-up solvent supplied from a syringe 16. The mixer outlet is connected to a 1 cm fused silica capillary (75±1.2 μm i.d., 150±μm o.d. Polymicro Technologies, Phoenix, Ariz.) that ends at the ESI source 5.

The method of analyzing a solution phase reaction according to the present invention employs the above-described capillary mixer-coupled mass spectrometer (for example, electrospray ionization mass spectrometer). The method may be applied to any solution phase reactions whose products, intermediates and/or reactants are suitable for ESI-MS analysis. In some embodiments, reactions to be analyzed involve organic substances having a wide range of molecular weights, including those substances having a relatively high molecular weight (say 1,000 to 1,000,000). Particularly preferred are enzyme-catalyzed reactions.

Enzyme catalysis is one example of such reactions that can be analyzed according to the present invention. The enzyme catalysis a vital component of all biological systems. Enzyme mechanisms range from simple two-step processes to complex multistep reactions.[57] Kinetic experiments are among the most important tools for elucidating these reaction mechanisms. Immediately after the initiation of an enzymatic reaction, there is a short period of time (milliseconds to seconds, depending on the rate constants involved) during which reaction intermediates become successively populated. It is during this "pre-steady-state" period, that the rate constants of individual steps can be measured. It is often possible to directly deduce reaction mechanisms based on pre-steady-state studies, whereas this is usually not the case for the more commonly employed steady-state measurements.[58-60] With very few exceptions[61], pre-steady-state kinetic studies require a time resolution in the millisecond range which can only be achieved by using automated rapid mixing techniques. Stopped-flow rapid mixing involves quickly flushing reactants through a mixer and into an observation cell. The flow is then stopped, and the reaction is monitored in real-time by optical methods 0.62 Quench-flow experiments also involve rapid mixing, but the reaction is quenched after predetermined delay times through addition of a suitable agent (e.g. acid, base or organic solvent). Subsequently, the mixture is analyzed off-line, e.g. by chromatography-based methods.[63] For continuous-flow studies, reactants are continuously passed through a mixer and into a reaction capillary. The reaction time at any point along this capillary depends on the tube dimensions, and on the flow rate used. Continuous-flow methods can have a time resolution in the sub-millisecond range.[64]

Typically, the kinetics in these different types of rapid mixing experiments are monitored optically, e.g., by UV-Vis absorption or by fluorescence spectroscopy. However, most reactions of enzymes with their "natural" substrates cannot be studied in this way because there are no associated chromophoric changes. For this reason, kineticists often use artificial substrate analogs that undergo a color change upon turnover. Obviously, this approach is problematic because the kinetics observed with these analogs are often different from those that would be observed with the natural substrate (s)[65] In some cases, the use of radioactively labeled substrates provides an alternative approach.[66, 67] However, radiochemical methods are somewhat cumbersome, and problems can arise due to nonspecific entrapment of the label.

In recent years, mass spectrometry (MS)-based techniques have shown great promise in the area of chemical and biochemical kinetics.[68-77] The most significant advantage offered by MS-based studies is that they do not require chromophoric substrates or radioactive labeling. Consequently, there is great interest in the application of MS for kinetic studies on enzyme-catalyzed processes.[65, 78-83] Electrospray ionization mass spectrometry (ESI-MS), in particular, has enormous potential as an alternative to the traditional methods for monitoring enzyme kinetics, because the reaction mixture can often be injected directly into the ion source for on-line analysis, while the reaction occurs in solution. This approach allows the identification of reactive species based on their mass-to-charge ratio and/or their MS/MS characteristics, while an analysis of the measured intensity-time profiles can provide reaction rates.[84]

For analyzing the solution phase reaction, the first reaction solution is forced (or allowed) to flow from its source 7 through the inner capillary 3 to the mixing region 9, into which the second reaction solution is similarly forced (or allowed) to flow from its source 8 through the intercapillary space 13 to the mixing region 9 where the two reactant solutions are mixed. The resulting mixed solution is then subjected to electrospray ionization at the inlet of the electrospray ionization unit. Ions formed by the ionization are measured by the mass spectrometer 6 such as a triple quadrupole mass spectrometer.

For an average flow velocity in the reaction capillary, the (average) reaction time τ at the ion source is given by the equation:

$$\tau = 1/\bar{v} \qquad (1)$$

where 1 is the length of the reaction capillary, i.e., the distance between the mixer and the capillary outlet. In contrast to previous continuous-flow ESI-MS systems,[5, 16, 30] 1 is variable for the setup used here; it can be controlled by changing the position of the inner capillary within the outer capillary. For a typical experiment, the mixer is initially located within the ESI source (i.e., at the end of the outer capillary), corresponding to τ≈0. The inner capillary can be continuously pulled back together with syringe 1 by a stepper motor-controlled mechanism. Experiments can therefore be carried out in kinetic mode by monitoring the abundance of selected ions as a function of τ, typically with a dwell time of 30 ms. This mode of operation is possible because the Flexon™ sleeve within the three-way union provides a low enough friction to allow the continuous withdrawal of the inner capillary, while ensuring a leak-proof connection. A withdrawal rate corresponding to 0.75 μL/min was used for the experiments of this work. Control experiments confirmed that the baseline of the kinetic experiments is unaffected by the positioning of the inner capillary. Data in spectral mode are obtained for selected time points τ by monitoring the entire mass spectrum of the reaction mixture at fixed values of 1.

For demetalation experiments, syringe 1 contained 40 μM chlorophyll in methanol and syringe 2 contained HCl in methanol at concentrations ranging from 30 to 100 mM. Both syringes were advanced at 30 μL/min for a total flow rate 60 μL/min in the reaction capillary. Ubiquitin refolding studies were carried out by having syringe 1 filled with 20 μM protein in 46% water, 50% methanol, and 4% acetic acid. Syringe 2 contained water. The two syringes were advanced at 20 and 50 μL/min, respectively, for a total flow rate of 70 μL/min. Final solution conditions after mixing ere 14.3% methanol and 1.1% acetic acid.

The analysis of kinetic data obtained in continuous-flow experiments would be easiest in the hypothetical case of "plug flow", characterized by a constant flow velocity throughout the cross-sectional area of the reaction capillary. In this case, τ would be identical to the reaction time t. Traditional continuous-flow studies with optical detection are carried out under turbulent flow conditions, where constant mixing of fast and slow regions within the capillary effectively causes all analyte molecules to travel with a velocity close to v. Data recorded under these conditions can be analyzed as if there were plug flow.[34-37]

For on-line ESI-MS experiments, turbulent flow cannot normally be attained. This is due to the use of relatively narrow reaction capillaries, typically having an inner radius R of 100 μm or less. Commonly used flow rates are in the range of tens to hundreds of microliters per minute, thus resulting in Reynolds numbers much smaller than the threshold value of 2000.[38] Under these conditions, the flow within the capillary is laminar, with a velocity profile v(r) that is given by the equation[39]

$$v(r)=v_{max}(1-(r^2/R^2)) \tag{2}$$

where r represents the radial position within the reaction capillary. The flow velocity at the center of the capillary, $v_{max}$, is twice the average flow velocity $\bar{v}$. This parabolic velocity profile has a tendency to distort the measured kinetics by "blurring" the time axis, because individual positions 1 along the reaction capillary cannot be associated with specific reaction times t. Instead, each value of 1 corresponds to a range of reaction times that are spread around the average value τ. We will now develop a data analysis strategy that takes into account these distortive laminar flow effects.

For analyte molecules traveling through the reaction capillary, the "age" a of each molecule is defined as the time required to move from the mixing point to the ion source. The probability that an analyte molecule has an age in the range a . . . a+da is given by P(τ,a)da, where P(τ,a) is the "age distribution function". For laminar flow, P(τ,a) can be derived from eq 2; it is given by[38]

$$P(\tau, a) = \frac{\tau^2}{2}\frac{1}{a^3} \text{ for } a \geq \tau/2$$

and $$P(\tau,a)=0 \text{ for } a<\tau/2 \tag{3}$$

As expected, this equation predicts an average solution age of (a)=τ at the ion source. The solid lines in FIG. 3 show examples of age distribution functions, calculated from eq 3, for 1=0.168 cm and for 1=16.8 cm (corresponding to τ=0.04 s and τ=4 s, respectively). The other parameters used for these calculated curves reflect the experimental conditions used in this work, i.e., a liquid flow rate of 65 μL/min, and a capillary radius of 91 μm, resulting in an average flow velocity of $\bar{v}$=0.042 m/s. In the hypothetical case of plug flow, P(τ,a) would be a narrow peak (δ function) centered at a=τ, as indicated by the dotted lines in FIG. 3. This is in stark contrast to the distribution functions predicted by eq 4 that have their maximums at a=τ/2.

Now consider a kinetic process for which the concentration of a particular reactive species as a function of time t is given by C(t). Kinetic profiles monitored by the mass spectrometer represent an average concentration ⟨C(τ)⟩ that can be calculated according to $$\langle C(\tau)\rangle=\int_0^\infty C(\alpha)P(\tau,\alpha)d\alpha \tag{4}$$

This equation is valid for any age distribution function P(τ,a). For the laminar flow conditions considered here, substitution of eq 3 into eq 4 results in $$\langle C(\tau)\rangle = \frac{\tau^2}{2}\int_{\tau/2}^{\infty} C(a)\frac{da}{a^3}. \tag{5}$$

To illustrate the effects of laminar flow on the measured ⟨C(τ)⟩ profiles we will consider the simple case of C(t)=exp (−k t). Kinetic profiles simulated based on eq 5 are shown as solid triangles in FIG. 3 for k=10 $s^{-1}$ (panel A) and k=1 $s^{-1}$ (panel B). The logarithmic plots of these profiles have a roughly linear appearance with an average slope of −0.698 k. Also shown are the corresponding kinetic profiles that would be expected in case of plug flow (solid circles in FIG. 4), which have a slope of −k. A simple-minded "plug-flow analysis" of the kinetic data, assuming the reaction time t to be equal to the parameter τ, would therefore introduce an error of −30% in the measured rate constants. For the current study, an iterative least-squares algorithm was therefore developed for fitting rate constants to the measured kinetic profiles based on eq 5. This approach can be employed for any mathematical C(t) expression.

An important assumption made for the derivation of eq 5 was that the diffusion of analyte molecules within the reaction capillary is negligible. We will now explore under what conditions this approximation is justified. Diffusion continuously changes the radial position and, hence, the flow velocity v(r) of individual analyte molecules as they travel along the reaction capillary. This diffusive mixing has a tendency to counteract the distortive effects of laminar flow on the measured kinetics. Previous work has shown that laminar flow effects are virtually eliminated in the case of[38]

$$\tau \gg R^2/36D \tag{6}$$

Figure 3A:
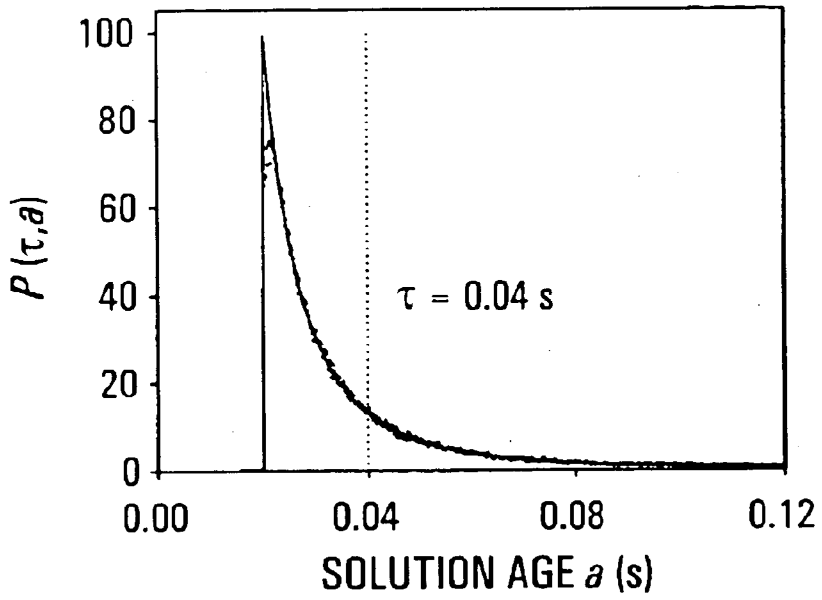
FIG. 3(A) is the graph when a capillary length 1 is 0.168 cm, corresponding to an average reaction time $\tau$ of 0.04 second.
Figure 3B:
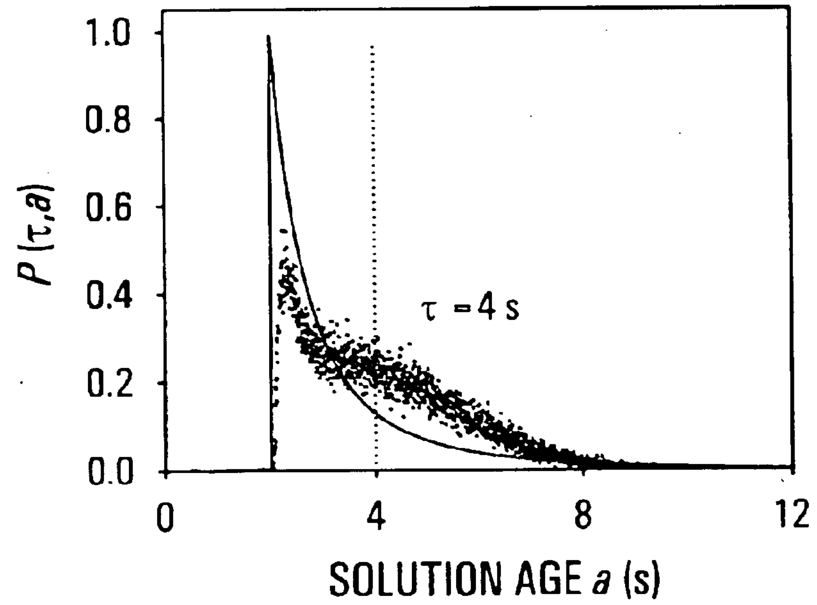
FIG. 3(B) is the graph when a capillary length 1 is 16.8 cm, corresponding to an average reaction time $\tau$ of 4 seconds. Solid lines are distribution functions calculated from equation (3), assuming a diffusion coefficient D of zero. The dotted curves are distribution functions simulated for $D=5\times10^{-10}$ $m^2/s$. Dotted vertical lines in both panels indicate a=$\tau$.

The dotted graphs in FIG. 3 show simulated age distribution functions for laminar flow in the presence of diffusion. These P(τ,a) curves were calculated by using a numerical method, [3] assuming a diffusion coefficient of D=5×$10^{-10}$ $m^2s^{-1}$, which corresponds to a molecule the size of sucrose (this compound (MW 342) was chosen as an example to illustrate the behavior of a small biological molecule). The "noisy" appearance of the distributions in FIG. 3 is due to the use of a random number generator for simulating the diffusion of individual analyte molecules. The effects of diffusion are insignificant for small values of τ, and the age distributions functions obtained under these conditions are very similar to those expected based on eq 3 (e.g., for τ=0.04 S, FIG. 3A). With increasing τ, more pronounced deviations between the two curves become apparent (e.g., for τ=4 S, FIG. 3B). In the limiting case described by relation 6, P(τ,a) resembles a Gaussian curve, centered at a=τ (data not shown).[38]

Figure 4A:
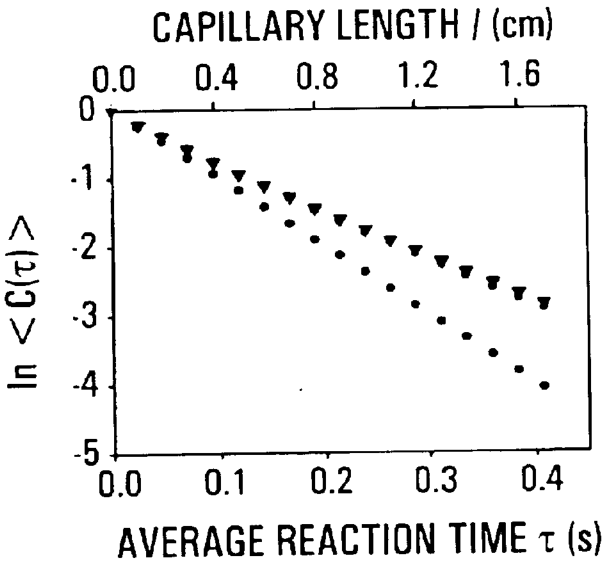
FIG. 4A is the graph when k is 10 $s^{-1}$ and FIG. 4B is the graph when k is 1 $s^{-1}$. Both panels show three data sets, representing plug flow (solid circles), laminar flow without diffusion (solid triangles) and laminar flow with diffusion (D $5\times10^{-10}$ $m^2/s$, open circles).
Figure 4B:
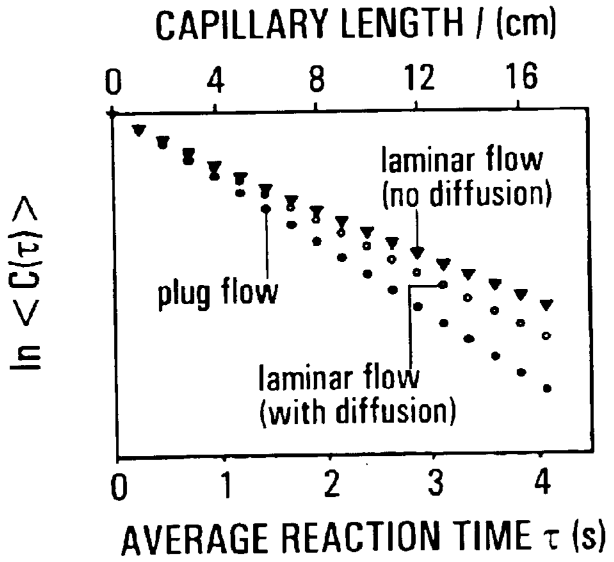

The effects of analyte diffusion on the measured kinetics can be taken into account by using the appropriate simulated age distribution functions in eq 4. Diffusion is insignificant for rapid chemical processes that require short experimental time windows. As an example, FIG. 4A shows that, for an exponential decay, C(t)=exp(−kt) with $k=10\ s^{-1}$, virtually identical kinetic profiles are obtained for laminar flow in the presence of diffusion ($D=5\times10^{-10}\ m^2s^{-1}$, open circles) and in the absence of diffusion (solid triangles, calculated from eq 5). For slower processes that require longer experimental time windows, diffusion is no longer negligible. This is illustrated in FIG. 4B for an exponential decay with $k=1\ s^{-1}$. Generalizing the results obtained from these simulations, we conclude that diffusion does not have to be taken into account for processes that have essentially gone to completion within a time window of $$\tau < R^2/36D \qquad (7)$$

such that the analysis of kinetic data can be carried out based on eq 5. For R=91 μm and $D=5\times10^{-10}\ m^2s^{-1}$, the value of $R^2/36D$ equals 0.46 s, which roughly corresponds to the conditions of FIG. 4A. Of course, this time window will be more extended for analytes with smaller diffusion coefficients. Equation 5 will also be valid for analyzing kinetic processes involving two reactants with different diffusion coefficients (e.g., the association of a protein with a small molecule), as long as condition 7 is satisfied for both species. However, if one of the two analytes is present in large excess, such that its concentration can be considered constant, only the diffusion coefficient of the limiting reactant will have to be taken into account.

EXAMPLES

The following Examples are presented for better understanding the present invention. However, these Examples should not be considered that the present invention is restricted to them.

EXAMPLE 1

Chemicals. Chlorophyll a from spinach and bovine ubiquitin were obtained from Sigma (St. Louis, Mo.). Distilled grade methanol and hydrochloric acid were supplied by Calcdon (Georgetown, ON, Canada) and glacial acetic acid was supplied by BDH (Toronto, ON, Canada). All chemicals were used without further purification.

Optical Stopped-Flow Measurements. These measurements were performed on an SFM-4 instrument (Bio-Logic, Claix, France), using an observation wavelength of 664 nm for monitoring the demetalation of chlorophyll. The two stepper motor-driven syringes used were advanced at 3.5 mL/s each, for an instrument dead time of 3.3 ms. All experiments were carried out at room temperature (22±1° C.).

On-Line Kinetic ESI-MS Measurements. These measurements were carried out using a custom-built continuous-flow mixing apparatus that is based on two concentric capillaries (FIG. 1).

Results

Instrument Performance in Kinetic Mode. The demetalation of chlorophyll a in acidic solution is a well-characterized process, during which the central magnesium of the porphyrin is displaced by two protons.[40-42] This reaction represents a convenient test system, because it allows kinetic measurements by ESI-MS and by standard optical stopped-flow absorption spectroscopy. When studied under pseudo-first-order conditions, the rate constant of the reaction is given by $k_{obs}=k[H^+]^2$. The intrinsic rate constant k in this expression is known to be strongly solvent-dependent.[41, 42]

Figure 5:
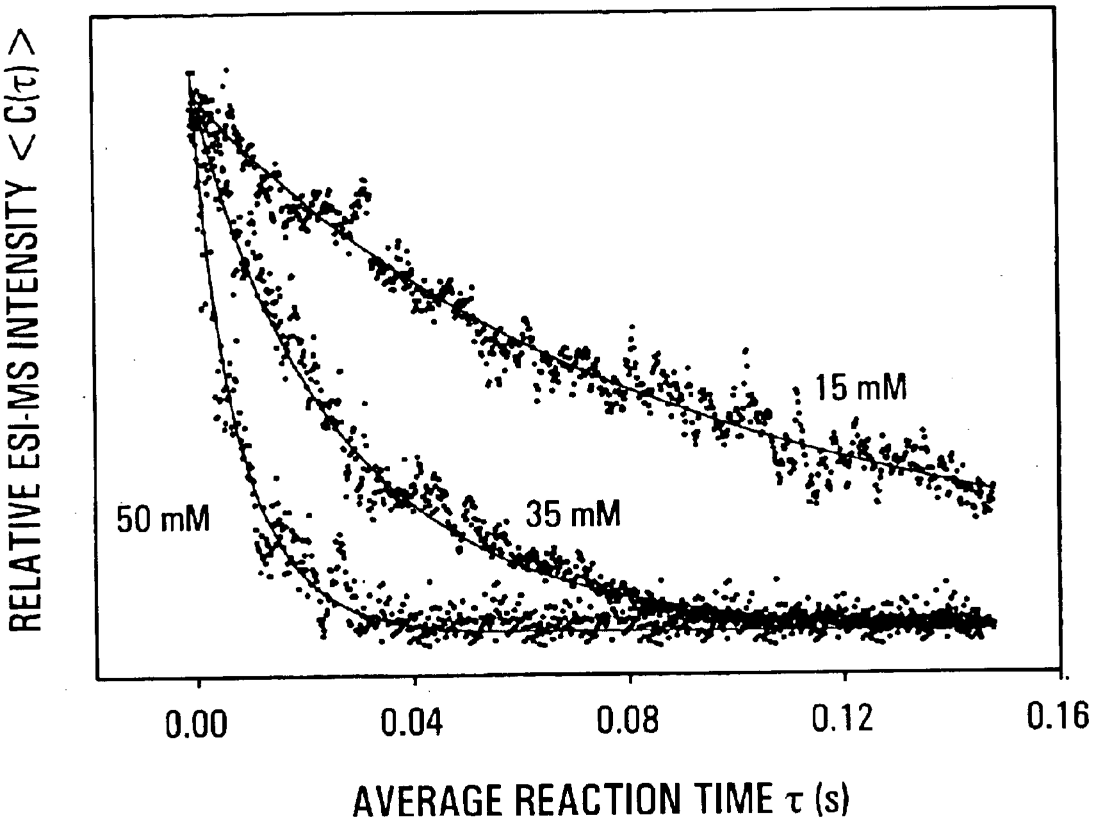
FIG. 5 is a graph showing demetalation kinetics of chlorophyll a (m/z 894) in methanol recorded by ESI-MS at three different concentrations of HCl. Solid lines represent fits based on equation (5) with $C(t)=a\exp(-k_{obs}t)$.
Figure 6:
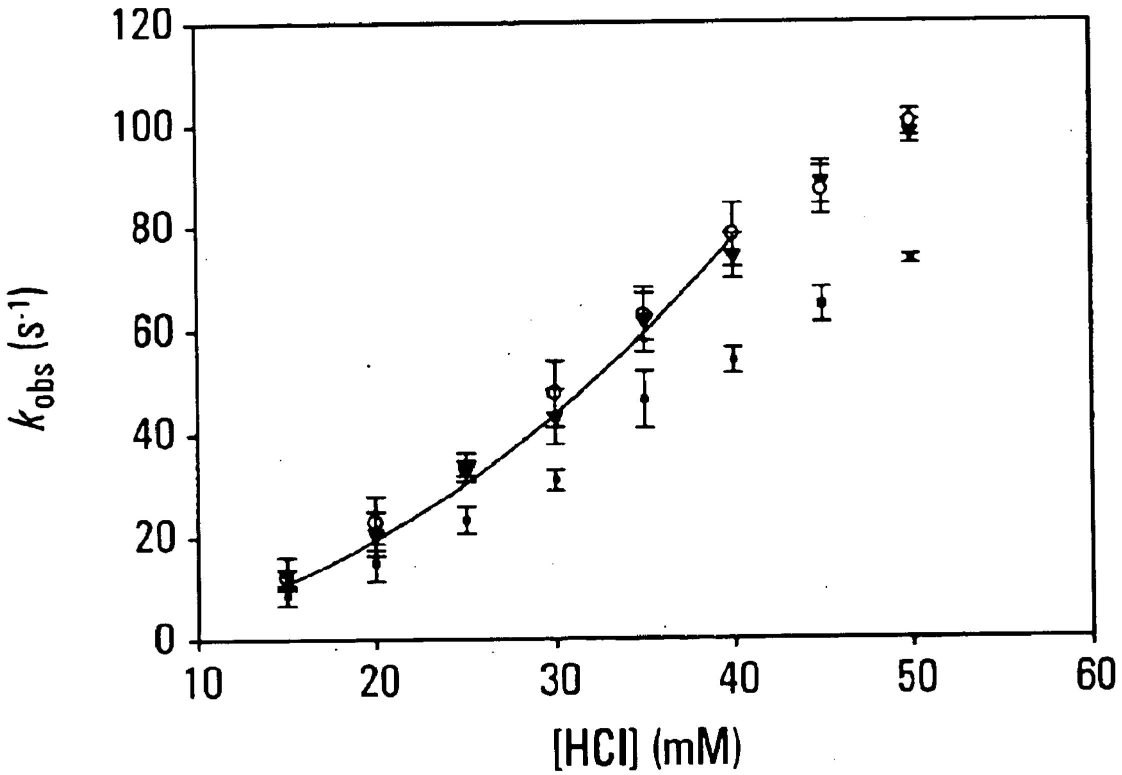
FIG. 6 is a graph showing pseudo-first-order rate constants $k_{obs}$ for the demetalation of chlorophyll a as a function of HCl concentration. Solid triangles are the results of ESI-MS kinetics that were analyzed based on equation (5), taking into account laminar flow effects. The solid line is a quadratic fit to these data ($k_{obs}$ values measured for the two highest acid concentrations were not considered for the fit). Open circles are data measured by standard optical stopped-flow spectroscopy. Also shown are $k_{obs}$ values that were obtained from the ESI-MS data by using a "plug flow" data analysis that fails to take into account laminar flow effects (small solid squares). Error bars are standard deviations, based on at least four independent measurements for each acid concentration.

The apparatus depicted in FIG. 1 was used for monitoring the kinetics of chlorophyll demetalation in methanol solution for acid concentrations ranging from 15 to 50 mM. FIG. 5 depicts three representative kinetic profiles, obtained by monitoring the intensity of singly charged chlorophyll at m/z 894. Also shown are fits to the experimental data base on eq 5, with C(t)=a exp ($-k_{obs}t$). The pseudo-first-order rate constants $k_{obs}$ obtained by ESI-MS were plotted as a function of acid concentration (FIG. 5, solid triangles). The open circles in FIG. 6 represent $k_{obs}$ values obtained from control experiments carried out by optical stopped-flow spectroscopy. There is excellent agreement between these two data sets throughout the whole range, covering pseudo-first-order rate constants from about 10 to 100 $s^{-1}$. The use of higher acid concentrations to obtain even larger rate constants was not possible due to the onset of corona discharge in the ion source region. Nevertheless, it is clear that the temporal resolution of our novel mixing device exceeds that of other on-line ESI-MS techniques, which so far allowed rate constants up to ~25 $s^{-1}$ to be measured.[16]

The solid line in FIG. 6 represents a quadratic fit to the $k_{obs}$ values measured by ESI-MS, based on the expression $k_{obs}=k[H^+]^2$. The resulting intrinsic rate constant has a value of $k=0.048\pm0.002\ mM^{-2}s^{-1}$. Within experimental error, this is identical to the k value of $0.050\pm0.001\ mM^{-2}\ s^{-1}$ that was obtained through a quadratic fit to the corresponding optical data (fit not shown). The $k_{obs}$ values obtained for acid concentrations of 45 and 50 mm evidently deviate from the expected quadratic behavior; therefore, these data points were not included for the fitting procedure. This deviation is likely due to a change in reaction mechanism which has previously been found to take place at high acid concentrations.[41]

FIG. 6 also shows the values of $k_{obs}$ that are obtained from an analysis that neglects the laminar flow profile within the reaction capillary ("plug-flow analysis", solid squares). In this case, the measured kinetics were assumed to have the form $\langle C(\tau)\rangle=\exp(k_{obs}\tau)$, with τ=1/v, as defined above. The rate constants determined by this method are lower than the actual values by a factor of 0.69±0.03, which is in excellent agreement with the value of 0.689 that is expected based on the results of the Theory and Data Analysis section. These observations confirm that laminar flow effects have to be taken into account for the accurate determination of rate constants under the conditions of the current work, and they attest to the validity of eq 5 as a data analysis tool.

Protein Folding Monitored in Spectral and Kinetic Modes. ESI-MS has become a standard method for monitoring conformational changes of proteins. In the positive ion mode, gas-phase proteins generated from tightly folded solution-phase conformations typically show relatively low charge states. In contrast, ions formed from unfolded proteins are more highly protonated and show a wider charge-state distribution. The physical reasons underlying this relationship between solution-phase protein conformation and ESI charge-state distribution are still a matter of debate[43-47]. Ubiquitin is a small (8565 Da) protein that is commonly used as a model system for folding studies.[48, 49] Its compact native structure breaks down in acidic solutions containing organic cosolvents such as methanol, to form an extended "A state" that has a non-native a-helical structure.[50] Folding transitions involving the A state of ubiquitin have previously been studied by ESI-MS, albeit not in kinetic experiments.[14, 51]

Figure 7A:
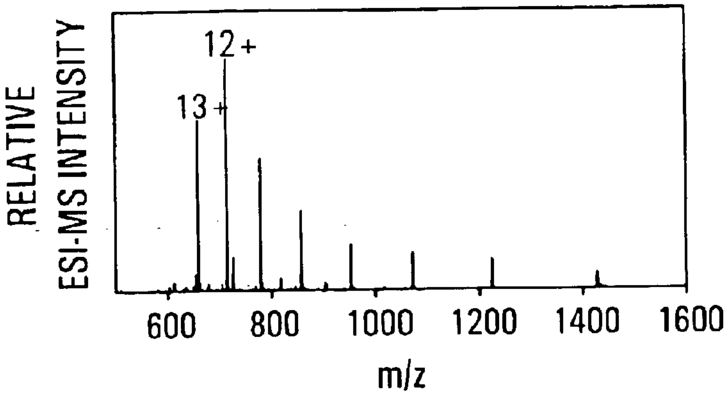
FIG. 7 is ESI mass spectra showing refolding of ubiquitin studied in spectral mode. ESI mass spectra are depicted for average reaction times of (A) $\tau\approx0$, (B) $\tau$=160 ms, and (C) $\tau$=2.1 s. The spectrum shown in panel D was recorded 5 min after initiation of refolding in a manual mixing experiment with off-line analysis. Notation: 13+ represents protein ions $[\text{ubiquitin}+13H]^{13+}$, etc. Panels A-C also show some minor peaks that presumably correspond to fragmentation products of the more highly charged protein ions.
Figure 7B:
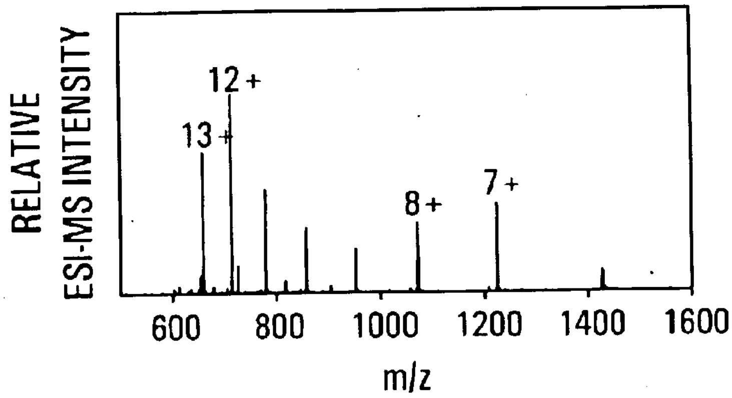
Figure 7C:
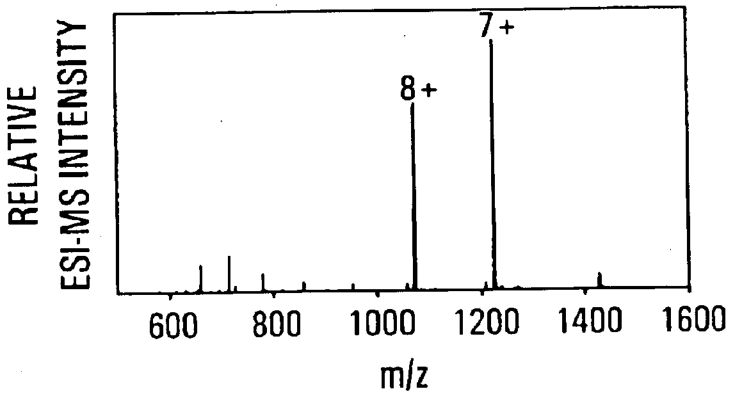
Figure 7D:
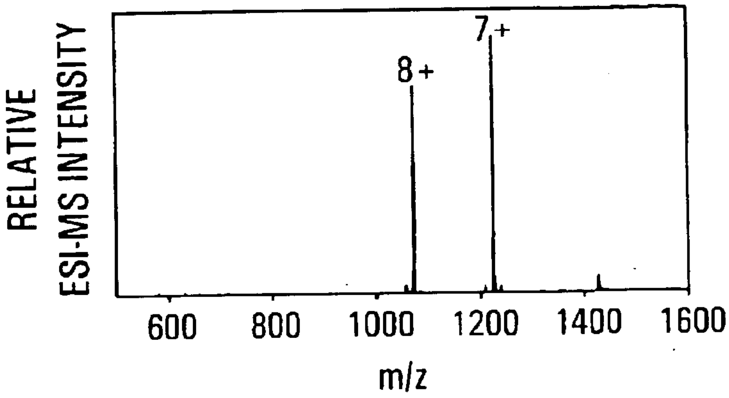

Here, the refolding of ubiquitin is used as a test reaction to demonstrate the performance of our continuous-flow setup in kinetic and in spectral mode. The A state was populated by exposing the protein to 50% methanol and 4% acetic acid; refolding was initiated by mixing with an excess volume of water. ESI mass spectra of ubiquitin for different times after initiation of refolding are depicted in FIG. 7. The initial spectrum, recorded for $\tau \approx 0$ ms (FIG. 7A), shows the 13+ and 12+charge states as the ions with the highest abundances. This spectrum is practically indistinguishable from that of the protein prior to initiation of refolding (data not shown) and very similar to ubiquitin A state spectra that have been published previously.[14, 51] As refolding proceeds, the relative abundance of highly charged protein ions decreases and that of the B+ and 7+ ions increases (FIGS. 7B,C). The final spectrum was recorded off-line 5 min after initiation of refolding in a manual mixing experiment. It shows the 8+ and 7+ ions as the only dominant peaks, indicating that virtually all of the proteins have refolded into a compact conformation (FIG. 7D).

Figure 8:
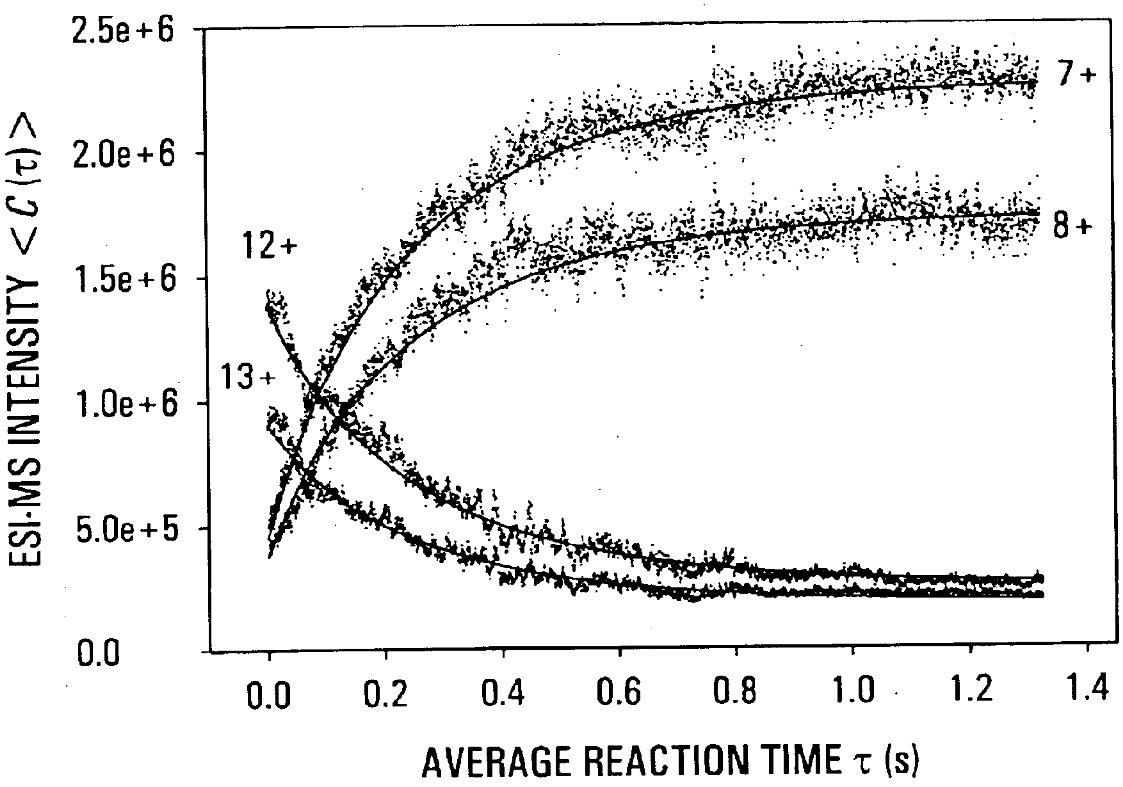
FIG. 8 is a graph showing refolding of ubiquitin studied in kinetic mode for four selected protein ions. Solid lines are fits based on equation (5).

FIG. 8 shows data measured in kinetic mode, obtained by recording the abundance of 13+, 12+, 9+, and 8+ ions as a function of the average reaction time $\tau$. The diffusion coefficient of ubiquitin can be estimated to be around $D=1\times10^{-10}$ $m^2/s$.[52] According to condition 7, this implies that diffusion effects on the observed kinetics are negligible in an experimental time window up to $\tau \approx 2$ s. The data can therefore be fitted based on eq 5 (solid lines in FIG. 8). $\langle C(\tau)\rangle$ expressions for the 13+ and 12+ions were generated by assuming the model function $C(t)=a_1 \exp(-k_{obs}t)+a_0$, whereas the analysis of the 8+ and 7+ ions was based on $C(t)=b_1(1-\exp(-k_{obs}t))+b_0$. The use of an offset in the exponential decays takes into account the observation that refolding does not go to completion within the experimental time window of ~1.3 s. Instead, the kinetic profiles level off at ~20% of their initial values. This effect can be attributed to a subpopulation of slow-folding ubiquitin molecules that contain non-native cis-proline isomers.[53] Proline isomerization, taking place on the order of tens of seconds, 54 is the rate-limiting step for the refolding of this subpopulation. FIG. 6D indicates that after 5 min these slow-folding proteins have also attained a compact conformation. Processes occurring on such a slow time scale are beyond the range accessible by our rapid mixing setup.

The $k_{obs}$ values obtained from the four fits in FIG. 8 are in close agreement: 5.3 (8+), 5.3 (9+), 5.2 (12+), and 5.1 $s^{-1}$ (13+), for an average value of 5.2 $s^{-1}$. Evidently, the experimental kinetics are well described by these monoexponential fits. This is in line with previous work that has shown ubiquitin to be a two-state folder, except for those few protein molecules that are affected by proline isomerization.[53] Unfortunately, a direct comparison of our measured $k_{obs}$ values with refolding rate constants from the literature is not possible, because previous kinetic studies involved the use of chemical denaturants that are not easily compatible with ESI-MS. Also, it is noted that wild-type ubiquitin does not contain any tryptophan residues or other chromophores that could serve as optical probes in kinetic refolding experiments. Previous kinetic studies were therefore carried out on a recombinant protein variant that contained a non-native tryptophan.[53, 55, 56] Because chromophores are not required for the ESI-MS based approach used here, kinetic studies could be performed directly on the wild-type protein.

Conclusions

We have developed a novel method for millisecond time-resolved studies by ESI-MS. The reaction volume of the described capillary mixing device is adjustable and can be controlled automatically. In contrast, previously available continuous-flow methods involved the use of reaction capillaries with different (fixed) lengths for controlling the reaction time, which caused the kinetic experiments to be relatively laborious.[30, 45] Also, the reproducible positioning of each of the reaction capillaries within the ion source represents a potential problem with this earlier approach. The method described in the current study eliminates both of these difficulties. Our novel mixing device offers the unique advantage of allowing ESI-MS-based experiments in two modes of operation; in "spectral mode", entire mass spectra can be recorded for selected time points, and in "kinetic mode", the intensity of selected ion signals can be monitored as a function of the average reaction time $\tau$. The device allows first-order rate constants up to at least 100 $s^{-1}$ to be measured reliably, which represents an improvement over previous time-resolved ESI-MS methods by at least a factor of 4. A potential concern for experiments on this time scale is the mixing efficiency of the reactant solutions in the intercapillary space. However, even the highest rate constants measured by ESI-MS in this work are in excellent agreement with the results of control experiments carried out on a standard commercial stopped-flow instrument, thus indicating that the mixing efficiency is not a limiting factor. In summary, it appears that the described method represents a versatile novel tool for kineticists working in a wide range of different areas, including enzymology, protein folding, and physical organic chemistry.

EXAMPLE 2

Chymotrypsin is a member of the serine protease family.[86-88] $Ser_{195}$ represents the reactive nucleophile in the active site of this enzyme. Although the physiological role of chymotrypsin is to serve as an endopeptidase, it also catalyzes the hydrolysis of esters, including numerous synthetic substrate analogs. Chymotrypsin shows a moderate degree of specificity for aromatic or bulky aliphatic substrates; hydrolytic cleavage occurs preferentially at the C-terminal side of phenylalanine, tyrosine, tryptophan or leucine.[89] The generally accepted reaction mechanism for chymotrypsin-catalyzed hydrolysis is depicted in Scheme 8.[57-59]

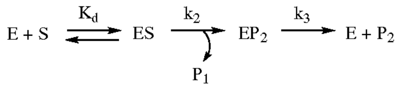

(8)

In the first step of this reaction sequence, the enzyme E and the substrate S form a noncovalent enzyme-substrate complex, ES, that is characterized by the dissociation constant $K_d$. Subsequently, $Ser_{195}$ forms a covalent bond with the carbonyl carbon of the substrate, thus releasing the first hydrolysis product $P_1$. The rate constant of this acylation step is denoted as $k_2$. The subsequent de-acylation has a rate constant of $k_3$, and it leads to regeneration of the free enzyme by hydrolysis of the $Ser_{195}$-ester bond, through release of the second hydrolysis product $P_2$. For conditions where S is present in large excess, it can be shown that the concentration of $P_1$ as a function of time t in the pre-steady-state regime is given by Equation 9[58, 59]:

$$[P_1](t)=C_1(1-\exp(-k_{obs}t))+C_2t \quad (9)$$

and the concentration-time profile of the covalent $EP_2$ complex can be expressed as Equation 10:

$$[EP_2](t)=C_3(1-\exp(-k_{obs}t)) \quad (10).$$

Consequently, the sum of the concentrations of free enzyme and ES complex are given by Equation 11:

$$([E_{free}]+[ES](t)=C_4\exp(-k_{obs}t)+C_5 \quad (11).$$

$C_1, \ldots, C_5$ in these expressions are constants, and $k_{obs}$ is given by Equation 12:

$$k_{obs}=k_3+\frac{k_2[S]}{K_d+[S]} \quad (12)$$

where [S] is the substrate concentration. Measurements of $k_{obs}$ as a function of substrate concentration allow the determination of the parameters $k_2$, $k_3$, and $K_d$ in Scheme 8.

For $t>>1/k_{obs}$, the exponential terms in Equations 9, 10 and 11 become negligible, thus marking the transition from the pre-steady-state to the steady-state regime. Under steady-state conditions, $[EP_2]$, $[E_{free}]$, and [ES] remain constant, whereas $[P_1]$and $[P_2]$ increase linearly with time. The rate of reaction under these steady-state conditions is given by the Michealis-Menten expression[57] 13:

$$\frac{d[P_1]}{dt}=\frac{d[P_2]}{dt}=\frac{k_{cat}[E]_0[S]}{K_M+[S]} \quad (13)$$

where $[E]_0$ is the total enzyme concentration. Measurements of the reaction rate as a function of [S], therefore, provide the turnover number $k_{cat}$ and the Michealis constant $K_M$.[60, 90, 91]

This work explores the application of our recently developed capillary mixer for kinetic studies on enzymatic reactions by ESI-MS. Using chymotrypsin as a model system, we will initially describe results obtained with the chromophoric substrate para-nitrophenyl acetate (p-NPA). The hydrolysis kinetics measured for this compound by ESI-MS are compared to optical data obtained by standard optical stopped-flow spectroscopy. Subsequently, the ESI-MS-based approach is used for studies on the hydrolysis of the peptide bradykinin, which represents a non-chromophoric substrate. It will be seen that the method employed here can provide detailed information on the kinetics and mechanisms of enzyme-catalyzed processes.

Chemicals. Chymotrypsin (a mixture of the α form and δ' forms) and para-nitrophenyl acetate (p-NPA) were obtained from Sigma (St. Louis, Mo.). Distilled grade methanol and hydrochloric acid were supplied by Calcdon (Georgetown, ON), glacial acetic acid was supplied by BDH (Toronto, ON) and ammonium hydroxide was supplied by Fisher (Nepean, ON). These chemicals were used without further purification. Bradykinin, supplied by Bachem (Torrence, Calif.), was extensively dialyzed against distilled water using a 100 MWCO Float-A-Lyzer™ (Spectrum Laboratories, Rancho Dominguez, Calif.) prior to use.

On-line kinetic ESI-MS experiments. ESI-MS-based kinetic experiments were carried out on a custom built continuous flow mixing apparatus described in FIG. 2. Briefly, this setup consists of two concentric capillaries, that are connected to sample injection syringes. Reactions are initiated by mixing of two solutions at the outlet of the inner capillary. The reaction time is determined by the solution flow rate, and by the distance between the mixing region and the end of the outer capillary. For experiments in kinetic mode, the inner capillary is steadily withdrawn from the end of the outer capillary, while the mass spectrometer is set to monitor selected m/z values, corresponding to specific solution-phase species, as a function of time. In spectral mode, the inner capillary is set at specific distances from the end of the outer capillary, such that entire mass spectra can be obtained for selected reaction times.

For the experiments described here, both reactant solutions were introduced into the apparatus at 20 μL/min using syringe pumps (Harvard Apparatus, Saint Laurent, QC) for a total flow rate of 40 μL/min after the mixer. One important modification compared to the mixer depicted in FIG. 1 is the addition of a mixing "tee" at the end of the outer capillary, which allows the addition of an "ESI-friendly" makeup solvent to the reaction mixture, immediately prior to ionization. The makeup solvent was infused at a flow rate of 40 μL/min, for a total flow rate of 80 μL/min at the ESI source. Ionization takes place by pneumatically-assisted ESI in the positive ion mode at a sprayer voltage of 6 kV. All measurements were carried out on a triple quadrupole mass spectrometer (PE Sciex, API 365, Concord, ON). It is noted that the makeup solvents used (see below) also act as chemical quenchers of the enzymatic reactions studied here. Therefore, the residence time of the solution in the flow system downstream of the second mixer (~30 ms) does not contribute to the total dead time of the kinetic measurements, which is also estimated to be around 30 ms. Analysis of the kinetic data obtained was carried out based on a framework described previously, that takes into account laminar flow effects in the reaction capillary.

Enzymatic reactions. The limited solubility of p-NPA in purely aqueous solutions necessitated the use of 20% (v/v) methanol in the reaction mixture. Solutions of similar (or even higher) organic content were used in previous studies on the chymotrypsin-catalyzed conversion of p-NPA.[93, 94] The activity of chymotrypsin does not seem to be affected by the presence of organic cosolvents at these concentrations.[95] Solutions containing 40% methanol and 1–10 mM p-NPA were brought to pH 8.1 using ammonium hydroxide. These solutions were mixed in a 1:1 ratio with 32 μM chymotrypsin in water for a final pH of 7.8, which corresponds to the pH optimum of the enzyme. A makeup solvent consisting of 5 mM HCl was found to produce the best signal-to-noise ratio for these p-NPA studies. Experiments on bradykinin were carried out in an analogous manner, but in purely aqueous solution, and by using 20% (v/v) acetic acid in water as makeup solvent. Control experiments showed the pH of the solutions to be stable for at least 5 s after mixing. Substrate concentrations given below represent the values in the reaction mixture, i.e., after the first mixing step. Burst phase kinetics observed by stopped-flow UV-Vis spectroscopy for p-NPA hydrolysis showed that the chymotrypsin used had an active enzyme content of 80% by weight. This factor was taken into account for calculations involving enzyme concentrations. All experiments were carried out at room temperature (22+1° C.).

Results

Figure 9A:
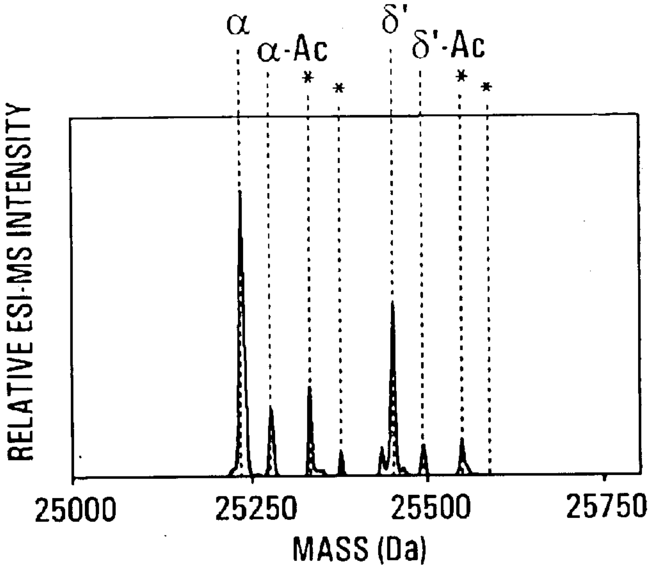
FIG. 9 shows deconvoluted ESI mass distributions recorded during the pre-steady-state of para-nitrohenyl acetate (p-NPA) hydrolysis by chymotrypsin. Peaks labeled with α and δ' correspond to α- and δ'-chymotrypsin, respectively. α-Ac and δ'-Ac refer to acetylated forms of the two enzyme species, corresponding to the covalent $EP_2$ complex in Scheme 8. Spectra were recorded at reaction times of 30 ms (A), 700 ms (B), and 3 s (C). The p-NPA concentration was 2 mM. All four forms of the protein (α, α-Ac, 67 ',δ'-Ac) form nonspecific adducts with unidentified low molecular weight contaminants, leading to minor peaks at masses that are (98±2) Da higher than those of the corresponding proteins. These adduct peaks are labeled with *. The occurrence of this kind of artifact in ESI-MS is very common.[80, 108] As expected[109], the extent of adduct formation depends on the declustering voltage in the ion sampling interface of the mass spectrometer. The adducts are also observed in the absence of any substrate (data not shown).
Figure 9B:
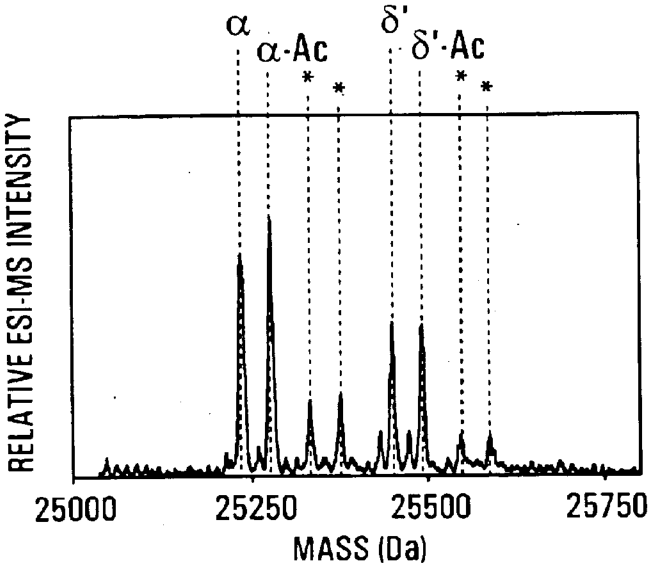
Figure 9C:
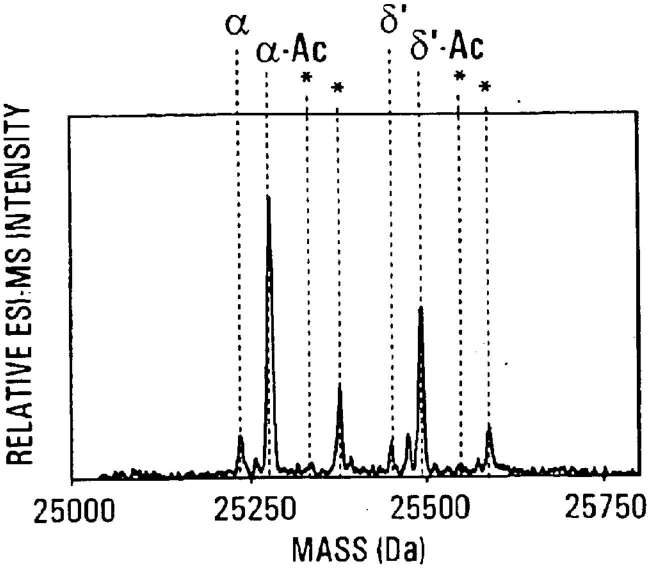
Figure 10A:
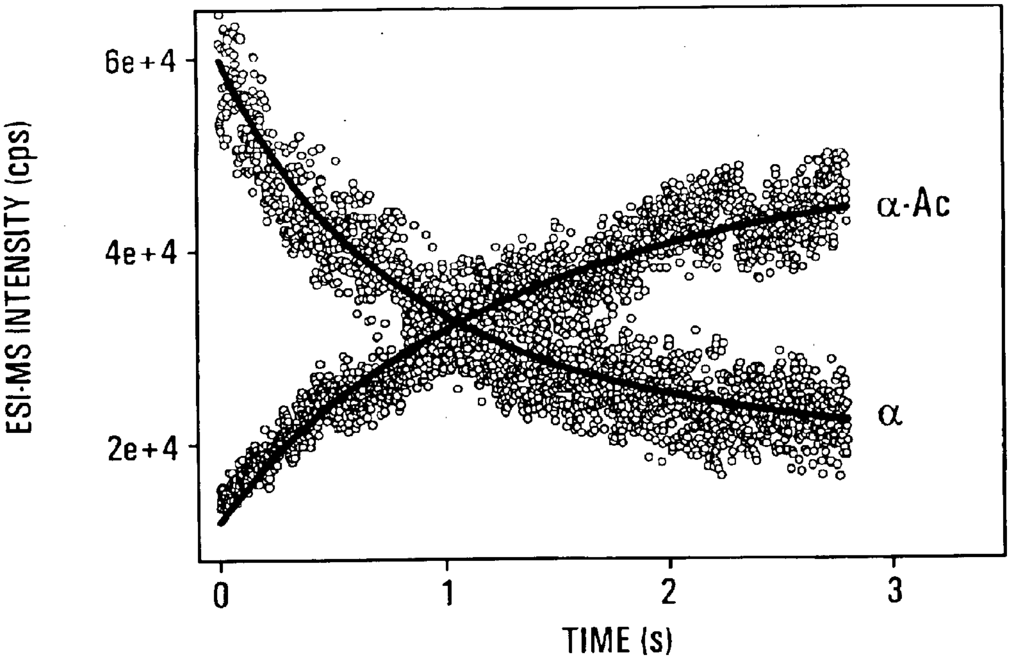
FIG. 10 shows pre-steady-state hydrolysis of p-NPA by chymotrypsin monitored by ESI-MS in kinetic mode. The two panels depict the depletion of unmodified α-chymotrypsin (α), and the formation of the acetylated α-chymotrypsin (α-Ac) at p-NPA concentrations of 1 mM (A), and 5 mM (B). The data were obtained by monitoring the $12^+$ charge state of free and acetylated enzyme at m/z 2103 and 2107, respectively. Solid lines are fits to the experimental data based on Equations 10 and 11.
Figure 10B:
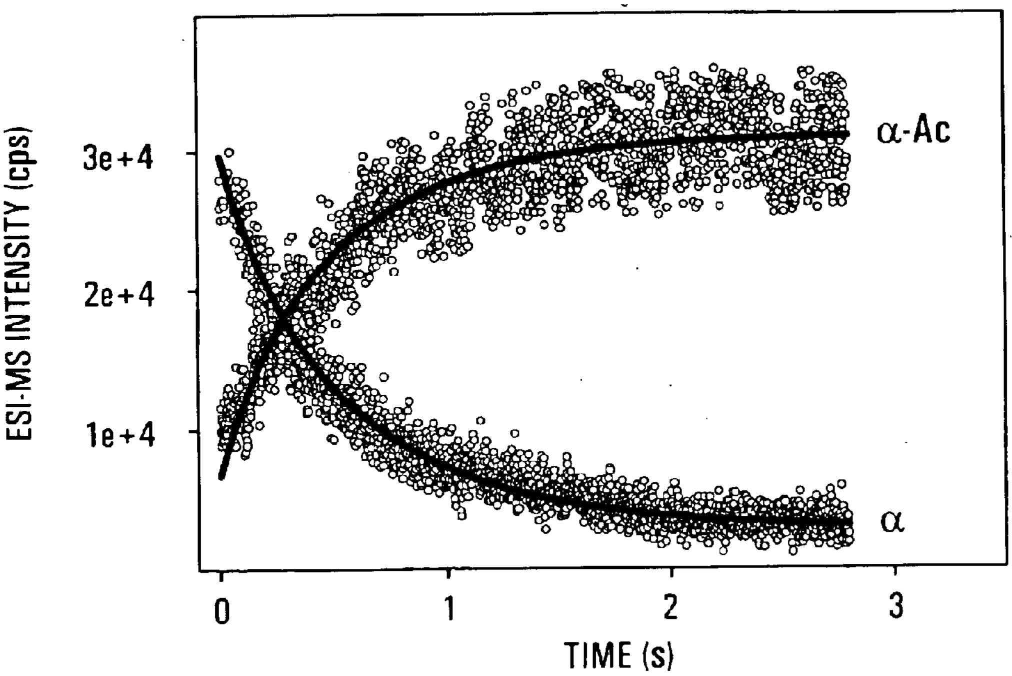

Hydrolysis Kinetics of p-NPA. The chymotrypsin-catalyzed hydrolysis of p-NPA generates para-nitrophenol (p-NP) and acetate. In the framework of Scheme 8, p-NP corresponds to $P_1$, and acetate correspond to $P_2$.[57-59, 89, 95] p-NPA was chosen as substrate for these studies, because the released p-NP has an intense yellow color, thus providing a convenient way to compare the ESI-MS-based kinetic experiments with the results of optical control experiments.[92, 94] ESI mass spectra were generated at various times after mixing the enzyme solution with p-NPA. FIG. 9 shows deconvoluted mass distributions, obtained at a p-NPA concentration of 2 mM, for three different reaction times. The two major peaks observed at τ≈30 ms (FIG. 9A) are assigned to the α and δ' forms of chymotrypsin. For a reaction time of 700 ms (FIG. 9B), both forms of the protein show pronounced satellite peaks that correspond to a mass increase of 43 Da. At t=3 s, these satellite peaks have become the dominant features in the mass distribution (FIG. 9C). The observed mass increase of 43 Da is attributed to the acetylation of $Ser_{195}$ in the active site of the enzymes. The three spectra depicted in FIG. 9, therefore, represent the pre-steady-state accumulation of the $EP_2$ complex in Scheme 8. The fact that both forms of the protein undergo acetylation confirms that both of them are catalytically active, as previously observed by Ashton et al.[99] FIG. 10 shows pre-steady-state intensity-time profiles of the unmodified and the acetylated forms of α-chymotrypsin. As predicted by Equation 12, the acetylation rate depends on the substrate concentration. Consequently, the measured kinetics are markedly slower at 1 mM p-NPA (FIG. 10A) than at 5 mM p-NPA (FIG. 10B). Very similar kinetics were observed for 6'-chymotrypsin (data not shown).

Figure 11:
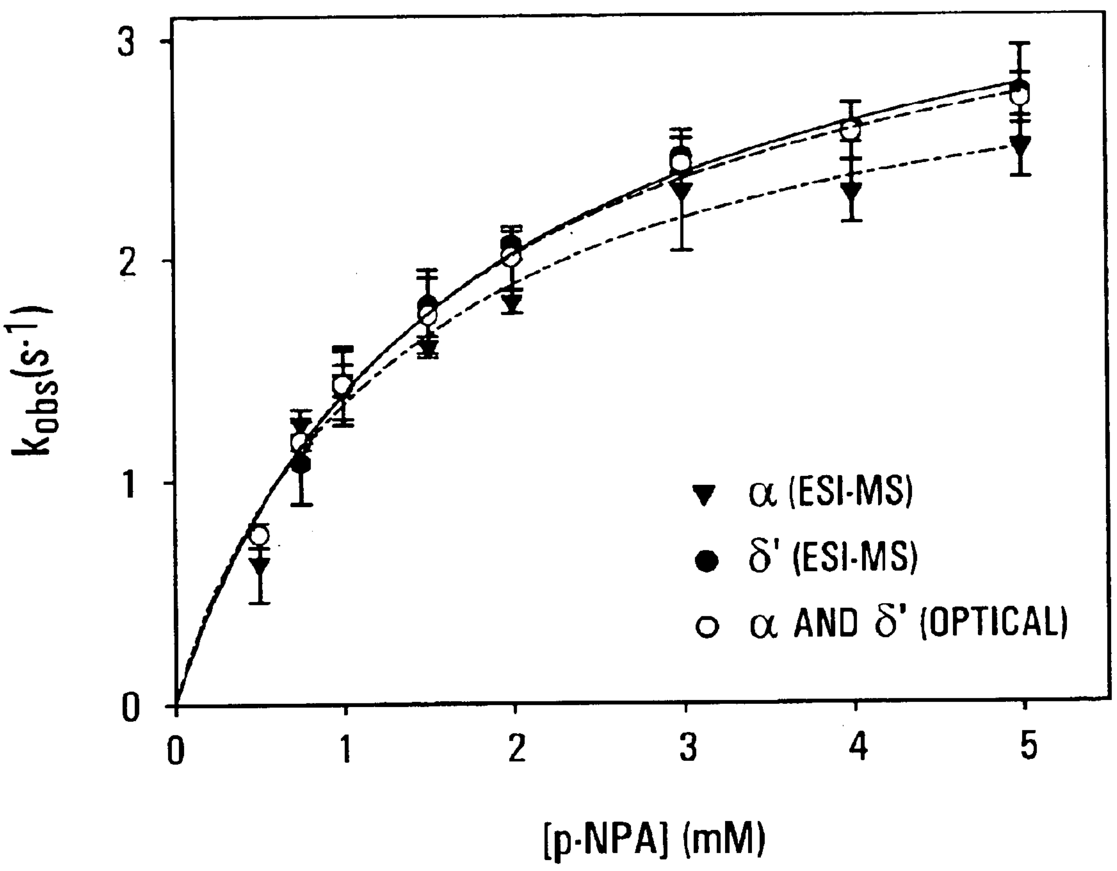
FIG. 11 shows measured $k_{obs}$ values for p-NPA hydrolysis by chymotrypsin as a function of substrate concentration. Solid triangles represent ESI-MS measurements for α-chymotrypsin, and solid circles depict the corresponding data for δ'-chymotrypsin. Each point represents the average of four fits (two intensity-time profiles for the formation of the acetylated enzymes, and two traces for the depletion on the non-acetylated forms). Open circles depict $k_{obs}$ values determined by optical stopped-flow spectroscopy in triplicate measurements. Error bars indicate standard deviations. Fits to these $k_{obs}$ values based on Equation 12 are given as solid line for the δ-chymotrypsin ESI-MS kinetics, as dashed line for the optical data, and as dash-dotted line for the α-chymotrypsin ESI-MS kinetics.

Exponential fits to the measured intensity-time profile provide the parameter $k_{obs}$ (see Equations 10 and 11). Plots of these $k_{obs}$ values as a function of p-NPA concentration are depicted in FIG. 11 for both forms of the enzyme. The values measured for δ'-chymotrypsin are slightly higher than those for α-chymotrypsin. However, the differences are small, and the error bars overlap for most data points. These observations are consistent with previous studies on chymotrypsin, that suggest that the various forms generated during processing of the enzyme have very similar structures and reaction kinetics.[57, 96, 100]

Fits to the measured $k_{obs}$ data based on Equation 12 yield $k_2$ values of (3.2±0.3) $s^{-1}$ and (3.7±0.3) $s^{-1}$ for α and δ'-chymotrypsin, respectively. The corresponding dissociation constants $K_d$ are (1.4±0.2) mM and (1.7±0.2) mM. Unfortunately, the value of $k_3$ is too small for an accurate determination by this method. This is entirely consistent with the accepted mechanism of p-NPA hydrolysis by chymotrypsin, according to which $k_3$ corresponds to the rate determining step in Scheme 8. Previous work has shown $k_3$ to be orders of magnitude smaller than $k_2$.[57-59] This difference in rate constants is responsible for the fact that the $EP_2$ complex accumulates during p-NPA hydrolysis, which is a prerequisite for meaningful pre-steady-state measurements. For this scenario ($k_3 << k_2$), the rate constant $k_3$ can be approximated by $k_{cat}$. Based on optical steady-state measurements, we found $k_3 \approx k_{cat}$ to be (0.034+0.003) s-1 (data not shown).

Measurements of $k_{obs}$ as a function of substrate concentration were also carried out by stopped-flow spectroscopy, using the release of the yellow p-NP moiety as optical probe. In contrast to the ESI-MS experiments, these optical studies cannot discern the two forms of the enzyme, and therefore the measured data represent a weighted average of the substrate conversion caused by a and δ'-chymotrypsin. The analysis of the optical kinetics was carried out based on Equation 9 (data not shown), and the results obtained are included in FIG. 11, yielding $k_2$ and $K_d$ values of (3.6+0.2) $s^{-1}$ and (1.6±0.1) mM, respectively. These results are in good agreement with those reported above, thus confirming the reliability of our ESI-MS-based method as a tool for monitoring the kinetics of enzymatic reactions.

The $k_2$ values obtained in the different experiments described here are close to the corresponding rate constant of 3 $s^{-1}$ that has been previously reported by Gutfreund and Sturtevant.[93] Also, our estimate of $k_3$ is in line with their reported value of 0.03 $s^{-1}$. However, the $K_d$ measurements in that work resulted in a value of 7 mM, which is substantially higher than the results obtained here. This discrepancy is not entirely unexpected, however, considering the much higher buffer concentrations used by those authors, together with the known dependence of $K_d$ on ionic strength.95

In summary, the pre-steady-state data on the hydrolysis of p-NPA clearly establish the viability of our ESI-MS-based method for mechanistic and kinetic studies on enzymatic processes. In the described experiments, the use of a chromophoric substrate allowed the independent confirmation of the measured kinetics by optical stopped-flow spectroscopy. We will now examine the conversion of a non-chromophoric compound, bradykinin, that cannot be followed by standard optical methods.

Hydrolysis Kinetics of Bradykinin. Bradykinin is a peptide consisting of nine amino acids (Arg-Pro-Pro-Gly-Phe-Ser-Pro-Phe-Arg, M. W. 1060 Da). Based on the known preference of chymotrypsin to induce hydrolysis on the C-terminal side of phenylalanine B9, both $Phe_5$-$Ser_6$ and $Phe_8$-$Arg_9$ represent potential cleavage sites. Preliminary studies showed the second of these possibilities to be preferred by a ratio of at least 100:1 (data not shown). Thus, $P_2$ in Scheme 1 corresponds to Argg, whereas $P_2$ is represented by the remainder of the peptide, i.e., Arg-Pro-Pro-Gly-Phe-Ser-Pro-Phe (M. W. 904 Da).

Figure 12:
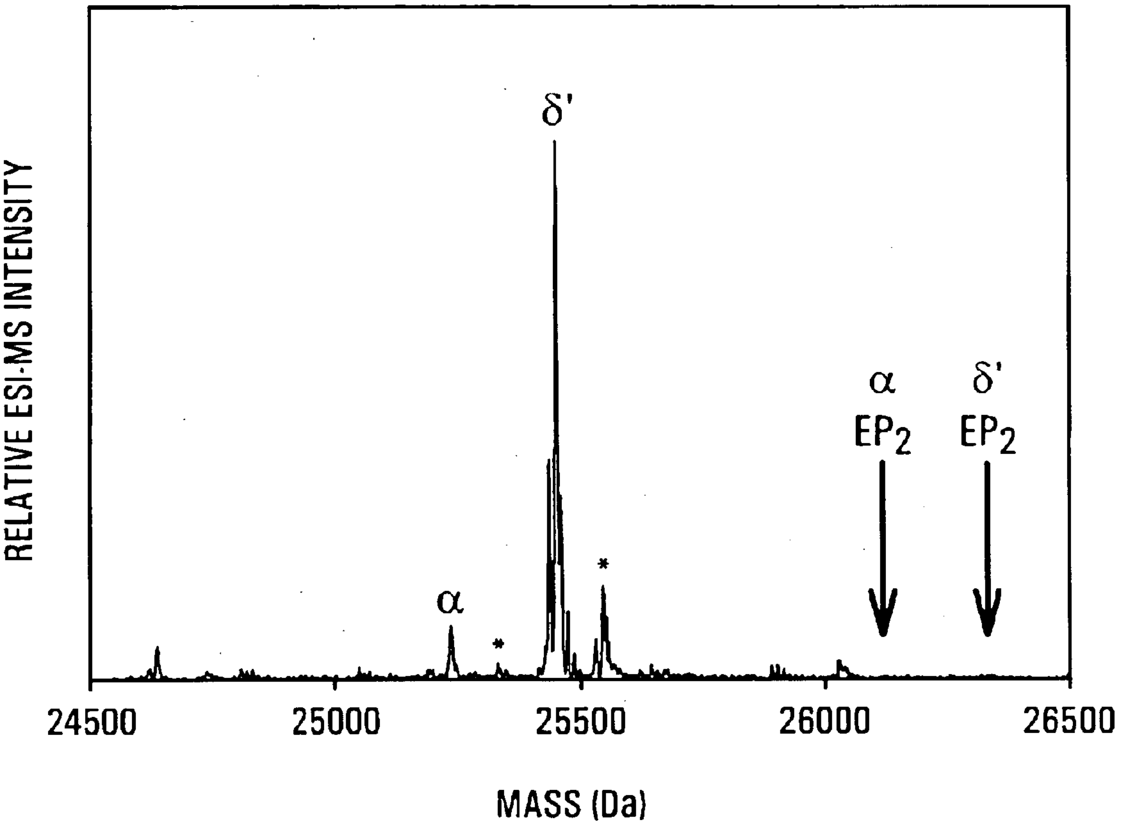
FIG. 12 shows deconvoluted ESI mass distribution obtained 0.2 s after mixing chymotrypsin with 2 mM bradykinin. Notation: α and δ' represent the two forms of the enzyme, and * indicates adduct peaks, as in FIG. 9. Arrows indicate the masses were the $EP_2$ complexes (Arg-Pro-Pro-Gly-Phe-Ser-Pro-Phe-[$Ser_{195}$-enzyme]) of α (26120 Da) and δ'-chymotrypsin (26335 Da) would be expected.

FIG. 12 shows the deconvoluted ESI mass distribution of chymotrypsin, 0.2 s after mixing with 2 mM bradykinin. The spectrum shows peaks corresponding to a and δ'-chymotrypsin, the latter being the dominant species in the enzyme lot that was used for these bradykinin experiments. In contrast to the kinetic measurements performed on p-NPA, neither the α nor the δ' form show any accumulation of an $EP_2$ complex. The same observation was made in experiments that used different reaction times, different substrate concentrations, and by using samples that had a different ratio of α- to δ'-chymotrypsin. The absence of an observable $EP_2$ complex in this case is not due to a lack of enzyme activity, on the contrary, it will be seen that the enzyme undergoes rapid turnover under the conditions of FIG. 12 (see below). It has previously been established that in the case of peptide bond hydrolysis by chymotrypsin, $k_3$ is much larger than $k_2$. In other words, acylation of the enzyme is the rate-determining step in Scheme 8 under these conditions.[57-59, 101, 102] $EP_2$ is being formed slowly and hydrolyzed quickly and, therefore, it does not become significantly populated at any point in the reaction. A pre-steady-state analysis, based on the concepts used above, is not possible under these conditions. Instead, it will be demonstrated how the ESI-MS-coupled capillary mixing setup can be applied to study the reaction kinetics under steady-state conditions.

Figure 13:
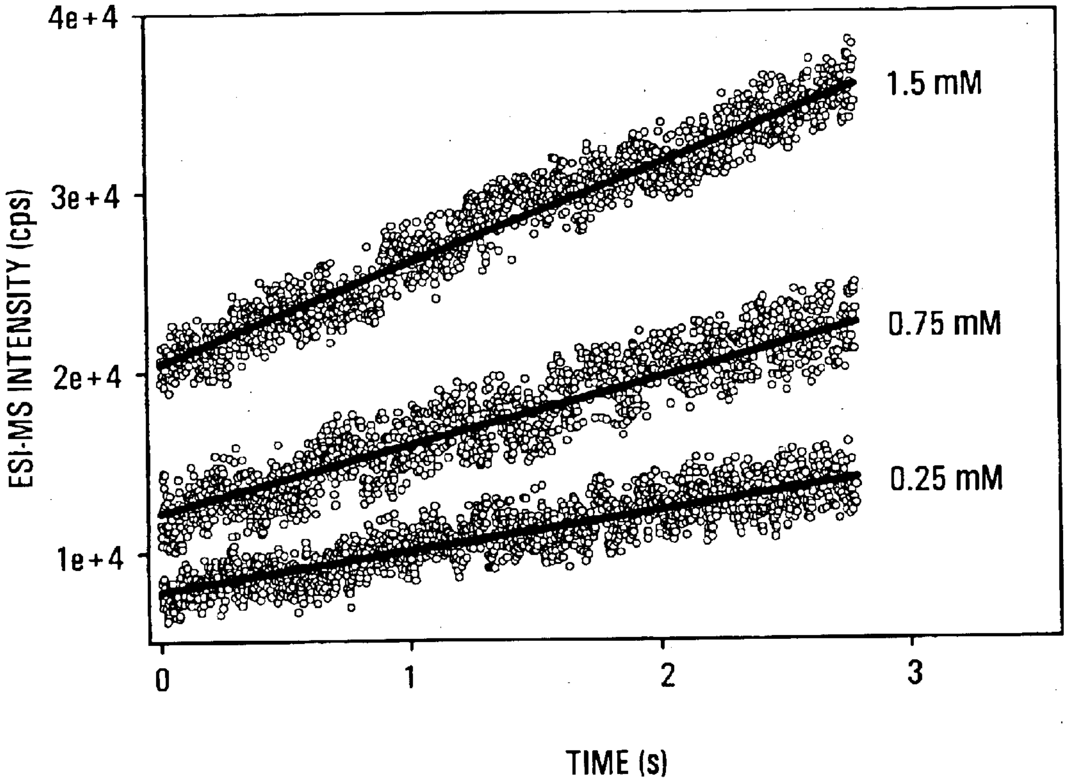
FIG. 13 shows chymotrypsin-catalyzed hydrolysis kinetics of bradykinin at three substrate concentrations. The signal intensity of the $[M+H]^+$ ion, corresponding to the hydrolysis product $P_2$ (Arg-Pro-Pro-Gly-Phe-Ser-Pro-Phe, m/z 905), was monitored as a function of time. Solid lines are fits to the experimental data.
Figure 14A:
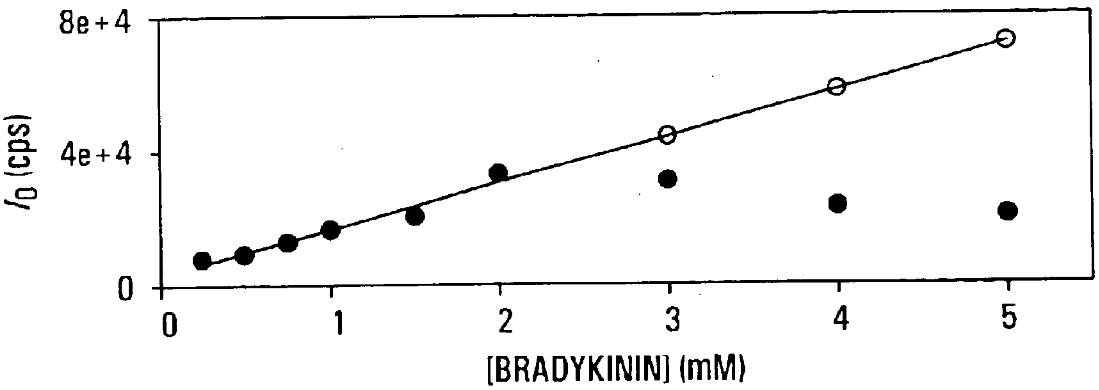
FIG. 14 shows data obtained for the hydrolysis of bradykinin by chymotrypsin, determined from kinetic profiles similar to those depicted in FIG. 13. (A) Dependence of the initial product intensity, $I_0$, on the bradykinin concentration. Open symbols for concentrations of 3, 4, and 5 mM correspond to values corrected for signal suppression effects. These corrected data points are based on a linear, extrapolation of the $I_0$ values measured at bradykinin concentrations of up to 2 mM (solid line). (B) Michealis-Menten plot of the reaction rate vs. substrate concentration. Closed symbols represent measured values. Open symbols correspond to reaction rates adjusted for signal suppression, they were obtained by multiplication of the measured values with correction factors obtained from panel (A). Slopes of the measured ESI-MS intensity profiles (in units of cps $s^{-1}$) were converted to reaction rates (in units of $M^{-1}$) by using a conversion factor of 84 cps $\mu M^{-1}$. This factor was determined in separate experiments, using standardized solutions of purified $P_2$ (6258=390 $M^{-1}$ $cm^{-1}$). The solid line in FIG. 14B is a fit to the corrected data set based on Equation 13.

The formation of $P_2$ was monitored at different bradykinin concentrations. Typical intensity-time profiles are depicted in FIG. 13, together with the corresponding linear fits. As predicted by Equation 13, the reaction rate increases with increasing substrate concentration. An unexpected feature of FIG. 13 is the observation of a concomitant increase of the initial signal intensities 10. This effect is caused by the presence of a small amount of $P_2$ as an impurity in the commercially supplied bradykinin substrate. A plot of $I_0$ for different bradykinin concentrations is depicted in FIG. 14A. This Figure shows a linear increase of $I_0$ up to substrate concentrations of about 2 mM. Surprisingly, this is followed by a range where $I_0$ decreases with increasing bradykinin concentration. This observation is attributed to a suppression of $P_2$ ions, caused by the very high concentration of bradykinin in the solution. Effects of this kind are a well known occurrence in ESI-MS.[103, 104]

Figure 14B:
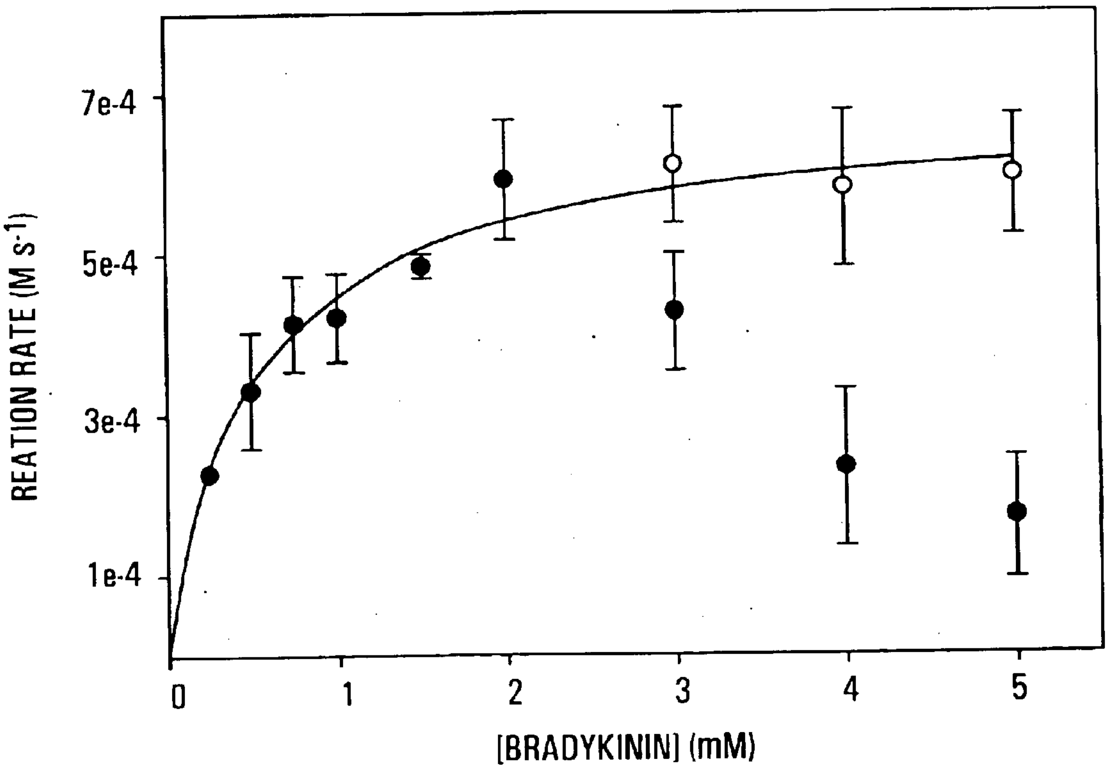

The dependence of the reaction rate on the bradykinin concentration was determined from the measured ESI-MS kinetic profiles, resulting in the data depicted in FIG. 14B. The measured rates increase up to a substrate concentration of 2 mM, followed by a decrease. This decrease is ascribed to the same signal suppression effect discussed for $I_0$. Using the $P_2$ impurity in the bradykinin solution as an internal calibrant, the measured reaction rates were corrected for this effect, employing the procedure outlined in the caption of FIG. 14. Thus, a Michealis-Menten plot was produced (FIG. 14B), from which the steady-state parameters $K_m$=(0.51+0.08) mM and $k_{cat}$=(43±2) $s^{-1}$ were determined, resulting in a specificity constant of $k_{cat}/K_{M=8.4\times10}{}^4$ $s^{-1}$ $M^{-1}$.

Given the fact that bradykinin is a non-chromophoric substrate, it is not surprising that there seems to be a lack of literature data for direct comparison with the steady-state kinetics reported here. DelMar et al.[105] have compiled parameters for a number of chromophoric oligopeptide substrate analogs of chymotrypsin. Many of these compounds show $K_m$ values in the range around 0.5 mM, which is consistent with our results. The $k_{cat}$ values of those substrate analogs show a large spread, from 0.01 $s^{-1}$ up to more than 100 $s^{-1}$, and specificity constants between 10 $s^{-1}$ $M^{-1}$ and 107 $s^{-1}$ M-1. The corresponding results obtained in the current study for a "natural" chymotrypsin substrate, therefore, are located in the mid-range of the parameters determined for those chromophoric compounds.

REFERENCES (1) Bruins, A. P.; Covey, T. R.; Henion, J. D. *Anal. Chem.* 1987, 59, 2642–2646.

(2) Feen, J. B.; Mann, M.; Meng, C. K.; Wong, S. F.; Whitehouse, C. M. *Science* 1989, 246, 64–71.

(3) Lee, E. D.; Muck, W.; Henion, J. D.; Covey, T. R. *J. Am. Chem. Soc.* 1989, 111, 4600–4604.

(4) Konermann, L.; Douglas, D. J. *Methods Enzymol.* 2002, 354, 50–64.

(5) Sam, J. W.; Tang, X. J.; Peisach, J. *J. Am. Chem. Soc.* 1994, 116, 5250–5256.

(6) Bakhtiar, R.; Hop, C. E. C. A. *J. Phys. Org. Chem.* 1999, 12, 511–527.

(7) Fligge, T. A.; Kast, J.; Bruns, K.; Przybylski, M. *J. Am. Soc. Mass Spectrom.* 1999, 10, 112–118.

(8) Zechel, D. L.; Konermann, L.; Withers, S. G.; Douglas, D. *J. Biochemistry* 1998, 37, 7664–7669.

(9) Northrop, D. B.; Simpson, F. B. *Bioorg. Med. Chem.* 1997, 5, 641–644.

(10) Norris, A. J.; Whitelegge, J. P.; Faull, K. F.; Toyokuni, T. *Biochemistry* 2001, 40, 3774–3779.

(11) Paiva, A. A.; Tilton, R. F.; Crooks, G. P.; Huang, L. Q.; Anderson, K. S. *Biochemistry* 1997, 36, 15472–15476.

(12) Lee, V. W. S.; Chen, Y.-L.; Konermann, L. *Anal. Chem.* 1999, 71, 4154–4159.

(13) Larson, J. L.; Ko, E.; Miranker, A. D. *Protein Sci.* 2000, 9, 427–431.

(14) Katta, V.; Chait, B. T. *J. Am. Chem. Soc.* 1993, 115, 6317–6321.

(15) Simmons, D. A.; Konermann, L. *Biochemistry* 2002, 41, 1906–1914.

(16) Simmons, D. A.; Dunn, S. D.; Konermann, L. *Biochemistry* 2003, 42, 5896–5905.

(17) Lin, H.; Dass, C. *Rapid Commun. Mass Spectrom.* 2001, 15±2341–2346.

(18) Maier, C. S.; Schimerlik, M. I.; Deinzer, M. L. *Biochemistry* 1999, 38, 1136–1143.

(19) Eyles, S. J.; Dresch, T.; Gierasch, L. M.; Kaltashov, I. A. *J. Mass Spectrom.* 1999, 34, 1289–1295.

(20) Brivio, M.; Fokkens, R. H.; Verboom, W.; Reinhoudt, D. N.; Tas, N. R.; Goedbloed, M.; van den Berg, A. *Anal. Chem.* 2002, 74, 3972–3976.

(21) Ørsnes, H.; Graf, T.; Degn, H. *Anal. Chem.* 1998, 70, 4751–4754.

(22) Northrop, D. B.; Simpson, F. B. *Arch. Biochem. Biophys.* 1998, 352, 288–292.

(23) Miranker, A.; Robinson, C. V.; Radford, S. E.; Aplin, R.; Dobson, C. M. *Science* 1993, 262, 896–900.

(24) Houston, C. T.; Taylor, W. P.; Widlanski, T. S.; Reilly, J. P. *Anal. Chem.* 2000, 72, 3311–3319.

(25) Gruebele, M. *Annu. Rev. Phys. Chem.* 1999, 50, 485–516.

(26) Knight, J. B.; Vishwanath, A.; Brody, J. P.; Austin, R. H. *Phys. Rev. Lett.* 1998, 80, 3863–3866.

(27) Roder, H.; Shastry, M. C. R. *Curr. Opin, Struct. Biol.* 1999, 9, 620–626.

(28) Kolakowski, B. M.; Simmons, D. A.; Konermann, L. *Rapid Commun. Mass Spectrom.* 2000, 14, 772–776.

(29) Kolakowski, B. M.; Konermann, L. *Anal. Biochem.* 2001, 292, 107–114.

(30) Konermann, L.; Collings, B. A.; Douglas, D. J. *Biochemistry* 1997, 36, 5554–5559.

(31) Sogbein, 0. O.; Simmons, D. A.; Konermann, L. *J. Am. Soc. Mass Spectrom.* 2000, 11, 312–319.

(32) Van Berkel, G. J.; Zhou, F.; Aronson, J. T. Int. *J. Mass Spectrom. Ion Processes* 1997, 162, 55–67.

(33) Konermann, L.; Silva, E. A.; Sogbein, O. F. *Anal. Chem.* 2001, 73, 4836–4844.

(34) Fersht, A. *Structure and Mechanism in Protein Science*; W. H. Freeman & Co.: New York, 1999.

(35) Johnson, K. A. *Methods Enzymol.* 1995, 249, 38–61.

(36) Hartridge, H.; Roughton, F. J. W. *Proc. R. Soc.* (*London*) 1923, A104, 376–394.

(37) Owens, G. D.; Margerum, D. W. *Anal. Biochem.* 1980, 52, 91A–106A.

(38) Konermann, L. *J. Phys. Chem. A* 1999, 103, 7210–7216.

(39) Probstein, R. F. *Physicochemical Hydrodynamics*, $2^{nd}$ ed.; John Wiley & Sons: New York, 1994.

(40) Heaton, J. W.; Lencki, R. W.; Marangoni, A. G. *J. Agric. Foodl, Chem.* 1996, 44, 399–402.

(41) Berezin, D. B.; Drobysheva, A. N.; Karmanova, L. P. *Russ. J. Phys. Chem.* 1976, 50, 720–723.

(42) Mazaki, H.; Watanabe, T. *Bull. Chem. Soc. Jpn.* 1988, 61, 2969–2970.

(43) Chowdhury, S. K.; Katta, V.; Chait, B. T. *J. Am. Chem. Soc.* 1990, 112, 9012–9013.

(44) Fenn, J. B. *J. Am. Soc. Mass Spectrom.* 1993, 4, 524–535.

(45) Konermann, L.; Rosell, F. I.; Mauk, A. G.; Douglas, D. *J. Biochemistry* 1997, 36, 6448–6454.

(46) Kaltashov, I. A.; Eyles, S. J. *Mass Spectrom. Rev.* 2002, 21, 37–71.

(47) Grandori, R. *J. Mass Spectrom.* 2003, 38, 11–15.

(48) Vijay-Kumar, S.; Bugg, C. E.; Cook, W. J. *J. Mol. Biol.* 1987, 194, 531–544.

(49) Kakuta, M.; Jayawickrama, D. A.; Wolters, A. M.; Manz, A.; Sweedler, J. V. *Anal. Chem.* 2003, 75, 956–960.

(50) Brutscher, B.; Brüschweiler, R.; Ernst, R. R. *Biochemistry* 1997, 36, 6.

(51) Konermann, L.; Douglas, D. J. *J. Am. Soc. Mass Spectrom.* 1998, 9, 1248–1254.

(52) Clark, S. M.; Konermann, L.; *J. Am. Soc. Mass Spectrom.* 2003, 14, 430–441.

(53) Krantz, B. A.; Sosnick, T. R. *Biochemistry* 2000, 39, 11696–11701.

(54) Brandts, J. F.; Brennan, M.; Lin, L. *Proc. Natl. Acad. Sci. U.S.A.* 1977, 74, 4178–4181.

(55) Khorasanizadeh, S.; Peters, I. D.; Butt, T. R.; Roder, H. *Biochemistry* 1993, 32, 7054–7063.

(56) Khorasanizadeh, S.; Peters, I. D.; Roder, H. *Nat. Struct. Biol.* 1996, 3, 193–205.

(57) Zubay, G. *Biochemistry,* 4 ed.; Wm. C. Brown: Dubuque, Iowa, 1998.

(58) Fersht, A. *Structure and Mechanism in Protein Science*; W. H. Freeman & Co.: New York, 1999.

(59) Hiromi, K. *Kinetics of Fast Enzyme Reactions: Theory and Practice*; John Wiley & Sons: New York, Chichester, Brisbane, Toronto, 1979.

(60) Konermann, L.; Douglas, D. J. *Meth. Enzymol.* 2002, 354, 50–64.

(61) Lu, W.-P.; Sun, Y.; Bauer, M. D.; Paule, S.; Koenigs, P. M.; Kraft, W. G. *Biochemistry* 1999, 38, 6537–6546.

(62) Johnson, K. A. *Meth. Enzymol.* 1995, 249, 38–61.

(63) Bothner, B.; Chavez, R.; Wei, J.; Strupp, C.; Phung, Q.; Schneemann, A.; Siuzdak, G. *J. Biol. Chem.* 2000, 275, 13455–13459.

(64) Shastry, M. C. R.; Luck, S. D.; Roder, H. *Biophys. J.* 1998, 74, 2714–2721.

(65) Northrop, D. B.; Simpson, F. B. *Bioorg. Med. Chem.* 1997, 5, 641–644.

(66) Anderson, K. S.; Sikorski, J. A.; Johnson, K. A. *Biochemistry* 1988, 27, 7395–7406.

(67) McCann, J. A. B.; Berti, P. J. *J. Biol. Chem.* 2003, 278, 29587–29592.

(68) Miranker, A.; Robinson, C. V.; Radford, S. E.; Aplin, R.; Dobson, C. M. *Science* 1993, 262, 896–900.

(69) Sam, J. W.; Tang, X. J.; Magliozzo, R. S.; Peisach, J. *J. Am. Chem. Soc.* 1995, 117, 1012–1018.

(70) Yang, H.; Smith, D. L. *Biochemistry* 1997, 36, 14992–14999.

(71) Ørsnes, H.; Graf, T.; Degn, H. *Anal. Chem.* 1998, 70, 4751–4754.

(72) Northrop, D. B.; Simpson, F. B. *Archives of Biochemistry and Biophysics* 1998, 352, 288–292.

(73) Gross, J. W.; Hegemann, A. D.; Vestling, M. M.; Frey, P. A. *Biochemistry* 2000, 39, 13633–13640.

(74) Simmons, D. A.; Dunn, S. D.; Konermann, L. *Biochemistry* 2003, 42, 5896–5905.

(75) Ding, W.; Johnson, K. A.; Kutal, C.; Amster, *J. Anal. Chem.* 2003, 75, 4624–4630.

(76) Kolakowski, B. M.; Simmons, D. A.; Konermann, L. *Rapid. Commun. Mass Spectrom.* 2000, 14, 772–776.

(77) Kolakowski, B. M.; Konermann, L. *Anal. Biochem.* 2001, 292, 107–114.

(78) Northrop, D. B.; Simpson, F. B. *FASEB J.* 1997, 11, A1021.

(79) Paiva, A. A.; Tilton, R. F.; Crooks, G. P.; Huang, L. Q.; Anderson, K. S. *Biochemistry* 1997, 36, 15472–15476.

(80) Zechel, D. L.; Konermann, L.; Withers, S. G.; Douglas, D. J. *Biochemistry* 1998, 37, 7664–7669.

(81) Houston, C. T.; Taylor, W. P.; Widlanski, T. S.; Reilly, J. P. *Anal. Chem.* 2000, 72, 3311–3319.

(82) Norris, A. J.; Whitelegge, J. P.; Faull, K. F.; Toyokuni, T. *Biochemistry* 2001, 40, 3774–3779.

(83) Li, Z.; Sau, A. K.; Shen, S.; Whitehouse, C.; Baasov, T.; Anderson, K. S. *J. Am. Chem. Soc.* 2003, 125, 9938–9939.

(84) Lee, E. D.; Muck, W.; Henion, J. D.; Covey, T. R. *J. Am. Chem. Soc.* 1989, 111, 4600–4604.

(85) Wilson, D. J.; Konermann, L. *Anal. Chem.* 2003, 75, 6408–6414.

(86) Blow, D. M. *Acc. Chem. Res.* 1976, 9, 145–152.

(87) Blow, D. M.; Birktoft, J. J.; Shartley, B. S. *Nature* 1969, 221, 337–340.

(88). Vandersteen, A. M.; Janda, K. D. *J. Am. Chem. Soc.* 1996, 118, 8787–8790.

(89) Hess, G. P. *The Enzymes* 1971, 3, 213–248.

(90) Fierke, C. A.; Hammes, G. G. *Meth. Enzymol.* 1995, 249, 3–37.

(91) Johnson, K. A. In *The Enzymes*, Third Edition ed.; Sigman, D. S., Ed.; Academic Press, Inc.: San Diego, New York, Boston, London, Sydney, Tokyo, Toronto, 1992; Vol. XX, pp 1–61.

(92) Head, M. B.; Mistry, K. S.; Ridings, B. J.; Smith, C. A.; Parker, M. J. *J. Chem. Ed.* 1995, 72, 184–186.

(93) Gutfreund, H.; Sturtevant, J. M. *Biochem. J.* 1956, 63, 656–661.

(94) Anderson, J.; Byrne, T.; Woelfel, K. J.; Meany, J. E.; Spyridis, G. T.; Pocker, Y. *J. Chem. Ed.* 1994, 71, 715–718.

(95) Faller, L.; Sturtevant, J. M. *J. Biol. Chem.* 1966, 241, 4825–4834.

(96) Freer, S. T.; Kraut, J.; Robertus, J. D.; Wright, H. T.; Xuong, N. H. *Biochemistry* 1970, 9, 1997–2009.

(97) Kraut, J. *The Enzymes* 1971, 3, 165–183.

(98) Blow, D. M. *The Enzymes* 1971, 3, 185–212.

(99) Ashton, D. S.; Beddell, C. R.; Cooper, D. J.; Green, B. N.; Oliver, R. W. A.; Welham, K. J. *FEBS Lett.* 1991, 292, 201–204.

(100) Niemann, C. *Science* 1964, 143, 1287–1296.

(101) Brandt, K. G.; Himoe, A.; Hess, G. P. *J. Biol. Chem.* 1967, 242, 3973–3982.

(102) Himoe, A.; Brandt, K. G.; Hess, G. P. *J. Biol. Chem.* 1967, 242, 3963–3972.

(103) Pan, P.; McLuckey, S. A. *Anal. Chem.* 2003, 75, 1491–1499.

(104) Pan, P.; McLuckey, S. A. *Anal. Chem.* 2003, 75, 5468–5474.

(105) DelMar, E. G.; Largman, C.; Brodrick, J. W.; Geokas, M. C. *Anal. Biochem.* 1979, 99, 316–320.

(106) Ghaemmaghami, S.; Fitzgerald, M. C.; Oas, T. G. *Proc. Natl. Acad. Sci. USA* 2000, 97, 8296–8301.

(107) Ganem, B.; Li, Y.-T.; Henion, J. D. *J. Am. Chem. Soc.* 1991, 113, 7818–7819.

(108) Cunniff, J. B.; Vouros, P. *J. Am. Soc. Mass Spectrom.* 1995, 6, 437–447.

(109) Collings, B. A.; Douglas, D. J. *J. Am. Chem. Soc.* 1996, 118, 4488–4489.

What is claimed is:

1. A capillary mixer for mixing a first reactant solution and a second reactant solution to form a mixed solution prior to delivering the mixed solution to an ion source of an ionization mass spectrometer, which mixer comprises:

a pair of concentric capillaries consisting of:

an outer capillary which is connected at a distal end thereof to an inlet of the ion source and is to be connected at or near a proximal end thereof to a source of the second reactant solution; and an inner capillary within the outer capillary, thereby forming an annular intercapillary space between the outer and inner capillary, wherein:

the inner capillary is to be connected at a proximal end thereof to a source of the first reactant solution and has an opening at or near a distal end thereof, is slidably sealed to the outer capillary at or near the proximal end of the outer capillary and is movable back and forth within the outer capillary, whereby in use, the first reactant solution is I! delivered from the source thereof through the inner capillary in a direction from the proximal end toward the distal end and the second solution is delivered from the source thereof through the intercapillary space in a direction from the proximal end to the distal end; and the first and second reactant solutions so delivered get mixed to form the mixed solution in a mixing region within the intercapillary space into which the first reactant solution is expelled through the opening.

2. The capillary mixer according to claim 1, which further comprises:

a mixing section between the distal end of the outer capillary and the inlet of the ion source, for adding a further liquid to the mixed solution immediately prior to being delivered to the ion source.

3. The capillary mixer according to claim 1, wherein the outer capillary is integrally formed with the inlet of the ion source.

4. The capillary mixer according to claim 1, wherein the inner capillary is plugged at the distal end thereof and one or more of the openings are formed in a wall of the inner capillary so that the first reactant solution is expelled laterally with respect to an axis of the capillaries into the mixing region.

5. An ionization mass spectrometer for determining a reaction rate of first and second reactants in a solution, which comprises:

an ion source;

a mass spectrometer downstream of the ion source; and a capillary mixer comprising a pair of concentric capillaries consisting of:

an outer capillary connected to an inlet of the ion source, and an inner capillary within the outer capillary, thereby forming an annular intercapillary space between the outer and inner capillaries, wherein:

the inner capillary has an opening at or near a distal end thereof close to the ion source, is movable back, and forth within the outer capillary and is slidably sealed, to the outer capillary at or near a proximal end of the outer capillary, whereby in use, the first reactant solution is delivered from a source thereof through the inner capillary in a direction from the proximal end toward the distal end, and the second reactant solution is delivered from a source thereof through the intercapillary space in a direction from the proximal end toward the distal end;

the first and second reactants so delivered get mixed to form a mixed reactant solution in a mixing region within the intercapillary space into which the first reactant solution is expelled through the opening; and the mixed reactant solution is delivered from the mixing region to the ion source.

6. The ionization mass spectrometer according to claim 5, wherein the ion source is an electrospray ion source; and the ionization mass spectrometer is an electrospray ionization mass spectrometer.

7. The ionization mass spectrometer according to claim 5, wherein the ion source is an atmospheric pressure ionization source; and the ionization mass spectrometer is an atmospheric pressure ionization mass spectrometer.

8. The ionization mass spectrometer according to claim 5, in which the capillary mixer further comprises:

a mixing section between the distal end of the outer capillary and the inlet of the ion source, for adding a further liquid to the mixed solution immediately prior to delivering the mixed solution to the ion source.

9. The ionization mass spectrometer according to claim 5, wherein the outer capillary is integrally formed with the inlet of the ion source.

10. The ionization mass spectrometer according to claim 5, wherein the inner capillary is plugged at the distal end thereof and one or more of the openings are formed in a wall of the inner capillary so that the first reactant solution is expelled laterally with respect to an axis of the capillaries into the mixing region.

11. The ionization mass spectrometer according to claim 5, wherein the mass spectrometer downstream of the electrospray ionization unit is a triple quadrupole mass spectrometer.

12. A method of analyzing a solution phase reaction of first and second reactants using an ionization mass spectrometer comprising:

an ion source;

a mass spectrometer downstream of the ion source; and a capillary mixer comprising a pair of concentric capillaries consisting of:

an outer capillary connected to an inlet of the ion source, and an inner capillary within the outer capillary, thereby forming an annular intercapillary space between the outer and inner capillaries, wherein:

the inner capillary has an opening at or near a distal end thereof close to the ion source, is movable back and forth within the outer capillary and is slidably sealed to the outer capillary at or near a proximal end of the outer capillary, which method comprises the steps of:

delivering the first reaction solution from a source thereof through the inner capillary in a direction from the proximal end toward the distal end and delivering the second reactant solution from a source thereof through the intercapillary space in a direction from the proximal end toward the distal end, expelling the first reactant solution through the opening into a mixing region within the intercapillary space to mix the first and second reactant solutions, thereby forming a mixed reactant solution and initiating the solution phase reaction, and delivering the mixed reaction solution from the mixing region to the ion source, to form ions of at least one product or intermediate product or both of the reaction, the ions being detected by the mass spectrometer.

13. The method according to claim 12, wherein the steps are conducted in a kinetic mode by continuously pulling back the inner capillary to provide intensity-time profiles for the product or intermediate product.

14. The method according to claim 13, wherein, separately from the kinetic mode, the steps are conducted in a spectral mode by fixing the inner capillary at a point relative to the outer capillary, to provide entire mass spectra for a selected reaction time.

15. The method according to claim 12, wherein the solution reaction is an enzyme catalysis; and one of the first and second reactants is an enzyme and the other is a substrate for the enzyme.

16. The method according to claim 15, wherein the enzyme is a serine protease.

17. The method according to claim 15, wherein the substrate is non-chromophoric.

18. The method according to claim 15, in which a pre-steady state of the enzyme catalysis is analyzed.

19. The method according to claim 12, wherein the ion source is an electrospray ion source; and the ionization mass spectrometer is an electrospray ionization mass spectrometer.

20. The method according to claim 19, which further comprises:

adding an electrospray ionization-friendly make-up solvent to the mixed solution through a mixing section between the distal end of the outer capillary and the inlet of the electrospray ion source, immediately prior to delivering the mixed solution to the electrospray ion source.

21. The method according to claim 20, wherein the electrospray ionization-friendly make-up solvent acts also to quench the solution reaction.

* * * * *